(12) United States Patent
Aizawa et al.

(10) Patent No.: US 7,347,317 B2
(45) Date of Patent: Mar. 25, 2008

(54) METHOD AND DEVICE FOR MEASURING CONVEYOR BELT ELONGATION, METHOD AND DEVICE FOR MEASURING CONVEYOR BELT WEAR EXTENT, METHOD AND DEVICE FOR MEASURING CONVEYOR BELT TEMPERATURE, RUBBER MAGNET SHEET, AND METHOD OF PRODUCING RUBBER MAGNET SHEET

(75) Inventors: Satoshi Aizawa, Kodaira (JP); Takahisa Shizuku, Kodaira (JP); Masami Kikuchi, Kodaira (JP); Kenichi Higashi, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 87 days.

(21) Appl. No.: 10/563,588

(22) PCT Filed: Jul. 1, 2004

(86) PCT No.: PCT/JP2004/009335

§ 371 (c)(1),
(2), (4) Date: Apr. 24, 2006

(87) PCT Pub. No.: WO2005/005292

PCT Pub. Date: Jan. 20, 2005

(65) Prior Publication Data

US 2006/0219528 A1    Oct. 5, 2006

(30) Foreign Application Priority Data

| Jul. 9, 2003 | (JP) | ............................. 2003-194390 |
| Oct. 2, 2003 | (JP) | ............................. 2003-344076 |
| Nov. 7, 2003 | (JP) | ............................. 2003-378468 |
| Dec. 4, 2003 | (JP) | ............................. 2003-405729 |

(51) Int. Cl.
*B65G 43/00* (2006.01)
(52) U.S. Cl. ............................. 198/810.02; 198/690.1
(58) Field of Classification Search ............ 198/502.2, 198/502.3, 690.1, 846, 847, 810.02
See application file for complete search history.

(56) References Cited

U.S. PATENT DOCUMENTS 3,742,477 A * 6/1973 Enabnit .................. 198/810.02
4,020,945 A * 5/1977 Takeno et al. ......... 198/810.02
4,621,727 A * 11/1986 Strader .................. 198/810.02

(Continued)

FOREIGN PATENT DOCUMENTS

| JP | A 51-51878 | 5/1976 |
| JP | A 51-55576 | 5/1976 |
| JP | U 5-25331 | 4/1993 |
| JP | A 6-48528 | 2/1994 |

(Continued)

*Primary Examiner*—James R. Bidwell
(74) *Attorney, Agent, or Firm*—Oliff & Berridge, PLC

(57) ABSTRACT

Methods and devices for measuring elongation, wear, and internal temperature of a conveyor belt to catch signs of conveyor belt failure such as breakage by detecting a magnetic field from a magnetic body by using a magnesium sensor, as well as a rubber magnet sheet as a magnetic body and a method of producing the sheet, the rubber magnet sheet being able to be used while it is embedded in the conveyor belt. To measure elongation of a running conveyor belt (11), a magnetic field of a magnetic body (2) embedded in the belt (11) is detected by a magnetism sensor (3) fixed to the earth, and elongation of the belt (11) is calculated from temporal variation of the detected magnetic field.

3 Claims, 18 Drawing Sheets

U.S. PATENT DOCUMENTS

| | | | |
|---|---|---|---|
| 5,705,861 A * | 1/1998 | Esguerra | 307/106 |
| 6,715,602 B1 * | 4/2004 | Gartland | 198/810.02 |
| 6,831,566 B1 * | 12/2004 | Kusel | 198/810.02 |
| 2005/0011733 A1 * | 1/2005 | Imai et al. | 198/690.1 |

FOREIGN PATENT DOCUMENTS

| | | | | |
|---|---|---|---|---|
| JP | A 2002-503802 | | 2/2002 | |
| JP | 2006-82925 | * | 3/2006 | 198/810.02 |

* cited by examiner (a)

(b)

(a)

(b)

(a)

(b)

(a)

(b)

METHOD AND DEVICE FOR MEASURING CONVEYOR BELT ELONGATION, METHOD AND DEVICE FOR MEASURING CONVEYOR BELT WEAR EXTENT, METHOD AND DEVICE FOR MEASURING CONVEYOR BELT TEMPERATURE, RUBBER MAGNET SHEET, AND METHOD OF PRODUCING RUBBER MAGNET SHEET

TECHNICAL FIELD

The present invention relates to a method and device for measuring conveyor belt elongation, a method and device for measuring conveyor belt wear extent, a method and device for measuring conveyor belt temperature, a rubber magnet sheet, and a method of producing a rubber magnet sheet.

BACKGROUND ART

Large-size conveyor belts are often used on the sites which have not been put in order and hence a person does not approach, such as natural resources exploiting sites, so that the maintenance and checkup thereof are not accomplished sufficiently. In such a site, the elongation, wear, or temperature of a part of the conveyor belt sometimes increases abnormally, and thereby the conveyor belt is broken suddenly, by which work is interrupted inevitably. In this case, much time and cost are needed for restoration. Therefore, a means for detecting signs of accident in advance has been demanded strongly to perform preventive maintenance. However, no effective means is available, which poses a problem.

Also, in the case where objects to be conveyed have high temperatures, the rubber of conveyor belt is often deteriorated by the heat, and finally it is broken. Therefore, monitoring for preventing the internal temperature of conveyor belt from increasing to a predetermined temperature or higher has been demanded. Actually, however, although a method of measuring the surface temperature of conveyor belt is available, a means for measuring the internal temperature thereof is unavailable.

The present invention has been made in view of the above circumstances, and accordingly an object of the present invention is to provide a method and device for measuring elongation, wear, and internal temperature of a conveyor belt by detecting a magnetic field from a magnetic body embedded in the conveyor belt to catch signs of conveyor belt failure such as breakage, and also to provide a rubber magnet sheet serving as a magnetic body capable of being used while being embedded in the conveyor belt and a method of producing the rubber magnet sheet.

DISCLOSURE OF THE INVENTION

Aspect <1> of the present invention provides a method of measuring conveyor belt elongation, wherein, when the elongation of a running conveyor belt is measured, a magnetic field from a plurality of rubber magnets embedded in the conveyor belt is detected by a magnetism sensor provided so that the displacement in the conveyor belt length direction is restrained, and the elongation of conveyor belt is determined from temporal variations in the detected magnetic field.

Aspect <2> of the present invention provides the method of measuring conveyor belt elongation according to aspect <1>, wherein the elongation e of conveyor belt is determined from Equation (1) of $$\epsilon = ((v \cdot ta - d)/d) \times 100 (\%) \quad (1)$$

where, ta is a time interval between two peaks appearing in the temporal variations in magnetic field detected by the magnetism sensor, v is a surface speed of conveyor belt, which is measured by a separate means, and d is a separation distance between the two peaks measured by relatively displacing the magnetism sensor in the conveyor belt length direction in a state in which the conveyor belt elongation is zero.

Aspect <3> of the present invention provides an apparatus for measuring conveyor belt elongation, which is used in the method of measuring conveyor belt elongation according to aspect <1> or <2>, wherein the apparatus includes a plurality of rubber magnets embedded so as to be arranged in the conveyor belt length direction; a magnetism sensor, which is provided so that the displacement in the conveyor belt length direction is restrained, for detecting a magnetic field from the rubber magnet; and a belt speed measuring means for measuring the surface speed of a conveyor belt, and the plurality of rubber magnets are arranged so that the direction of magnetic poles intersects at right angles to the surface of conveyor belt, and is opposite between the adjacent rubber magnets.

Aspect <4> of the present invention provides the apparatus for measuring conveyor belt elongation according to aspect <3>, wherein a width direction guide for regulating the position of conveyor belt in the widthwise direction is provided on both sides in the belt width direction of the magnetism sensor.

Aspect <5> of the present invention provides the apparatus for measuring conveyor belt elongation according to aspect <3> or <4>, wherein the plurality of rubber magnets are provided in the vicinity of a joint portion extending in the widthwise direction of a reinforcing material constituting the conveyor belt.

Aspect <6> of the present invention provides the apparatus for measuring conveyor belt elongation according to any one of aspects <3> to <5>, wherein the belt speed measuring means is formed by a means for measuring the rotational speed of a pulley around which the conveyor belt is set.

Aspect <7> of the present invention provides a method of measuring conveyor belt wear extent, wherein, when the wear extent of the surface of a running conveyor belt is measured, a magnetic field from a rubber magnet which is provided in a desired portion of conveyor belt and a part of which is exposed on the conveyor belt surface is detected by a magnetism sensor fixed to the earth, and the wear extent of conveyor belt is determined from the magnitude of the detected magnetic field by utilizing a phenomenon that the magnetic field is varied by a decrease in volume of rubber magnet caused by the progress of wear of the desired portion of conveyor belt.

Aspect <8> of the present invention provides an apparatus for measuring conveyor belt wear extent, which is used in the method of measuring conveyor belt wear extent described in <7>, wherein the apparatus includes a rubber magnet provided in a desired portion of a conveyor belt and a magnetism sensor for detecting a magnetic field from the rubber magnet, the rubber magnet is arranged so that the magnetic poles are directed in the belt thickness direction, and one magnetic pole is exposed on the conveyor belt surface.

Aspect <9> of the present invention provides the apparatus for measuring conveyor belt wear extent according to aspect <8>, wherein a width direction guide for regulating the position in the widthwise direction of a conveyor belt portion passing through a position close to the magnetism sensor is provided.

Aspect <10> of the present invention provides a method of measuring conveyor belt temperature, wherein, when the temperature of a running conveyor belt is measured, a magnetic field from a temperature-sensitive rubber compound magnet embedded in a desired portion of conveyor belt is detected by a magnetism sensor fixed to the earth, and the temperature of conveyor belt is determined from the magnitude of the detected magnetic field by utilizing the phenomenon that the magnetic field varies depending on the temperature of the desired portion.

Aspect <11> of the present invention provides an apparatus for measuring conveyor belt temperature, which is used in the method of measuring conveyor belt temperature according to aspect <10>, wherein the apparatus includes a temperature-sensitive rubber compound magnet which is embedded in a desired portion of conveyor belt and has magnetic poles of reverse polarity at both ends and a magnetism sensor for detecting a magnetic field from the temperature-sensitive rubber compound magnet, and the temperature-sensitive rubber compound magnet has a property that the magnetic force varies in accordance with temperature variations in the predetermined temperature range.

Aspect <12> of the present invention provides the apparatus for measuring conveyor belt temperature according to aspect <11>, wherein the temperature-sensitive rubber compound magnet consists of a permanent magnet and a temperature-sensitive magnetic body connected to one magnetic pole of the permanent magnet so as to extend the permanent magnet, the temperature-sensitive magnetic body having a property that the permeability decreases as the temperature rises in the temperature range, and the permanent magnet and the temperature-sensitive magnetic body are formed by a bond magnetic body formed by mixedly dispersing magnetic particles into a rubber.

Aspect <13> of the present invention provides the apparatus for measuring conveyor belt temperature according to aspect <11>, wherein the temperature-sensitive rubber compound magnet consists of a permanent magnet and a temperature-sensitive magnetic body arranged around the permanent magnet, the temperature-sensitive magnetic body having a property that the permeability decreases as the temperature rises in the temperature range, and the permanent magnet and the temperature-sensitive magnetic body are formed by a bond magnetic body formed by mixedly dispersing magnetic particles into a rubber.

Aspect <14> of the present invention provides the apparatus for measuring conveyor belt temperature according to any one of aspects <11> to <13>, wherein a width direction guide for regulating the position in the widthwise direction of a conveyor belt portion passing through a position closest to the magnetism sensor is provided.

Aspect <15> of the present invention provides the apparatus for measuring conveyor belt temperature described according to any one of aspects <11> to <14>, wherein the magnetism sensor is provided in the vicinity of the downstream side in the conveyor belt running direction of a charging portion in which objects to be conveyed are charged.

Aspect <16> of the present invention provides a rubber magnet sheet including a matrix consisting of at least one kind of rubber component selected from a group consisting of butyl rubber and silicone rubber, and magnetically anisotropic magnetic particles dispersed into the matrix, wherein magnetic poles having a different polarity on the top and back surfaces are provided;

in a tensile test in conformance to DIN 3 standard, the breaking elongation at a rate of pulling of 100 mm/min is 10% or higher;

in the case where a cylindrical sample with a thickness of 0.5 mm, a width of 2 mm, and an inside diameter of 20 mm, is radially crushed under a radial crushing condition that the cylindrical sample is radially crushed at a stroke of 10 mm in the radial direction of the sample at a frequency of 2 times per second, the number of radial crushing cycles until the cylindrical sample is fractured is 10,000 or larger; and in a flat sample sheet having top and back surfaces measuring 17 mm long by 17 mm wide by 1.3 mm thick, the magnetic flux density in the direction perpendicular to the top or back surface at a position 20 mm distant from the center of either of the top and back surfaces is 2 mT or higher.

Aspect <17> of the present invention provides the rubber magnet sheet according to aspect <16>, wherein the decrease in magnetic flux density after the flat sample sheet has been allowed to stand at ordinary temperature for 24 hours in an environment in which magnetism of a magnitude greater than the geomagnetism does not exist in the surroundings is 0.1% or less as compared with the case before the flat sample sheet is allowed to stand.

Aspect <18> of the present invention provides the rubber magnet sheet according to aspect <16> or <17>, wherein the decrease in magnetic flux density after 10,000 cycles of radial crushing under the above-described radial crushing condition is 0.1% or less as compared with the case before the radial crushing.

Aspect <19> of the present invention provides the rubber magnet sheet according to any one of aspects <16> to <18>, wherein the surface hardness specified in JIS S6050 is 50 to 90 degrees.

Aspect <20> of the present invention provides the rubber magnet sheet according to any one of aspects <16> to <19>, wherein the content of the magnetic particles is 50 to 75 percent by volume.

Aspect <21> of the present invention provides the rubber magnet sheet according to any one of aspects <16> to <20>, wherein the rubber component is butyl rubber, the degree of unsaturation is 0.3% or higher, and the Mooney viscosity $ML_{1+4}$(100° C.) is 60 or lower.

Aspect <22> of the present invention provides the rubber magnet sheet according to any one of aspects <16> to <21>, wherein the butyl rubber contains halogenated butyl rubber.

Aspect <23> of the present invention provides the rubber magnet sheet according to any one of aspects <16> to <20>, wherein the rubber component is silicone rubber, and the silicone rubber is heat curing silicone rubber or cold-setting RTV.

Aspect <24> of the present invention provides the rubber magnet sheet according to any one of aspects <16> to <23>, wherein the 50% diameters of the magnetic particles measured with a laser diffraction particle size distribution meter are 75 μm or smaller.

Aspect <25> of the present invention provides the rubber magnet sheet according to any one of aspects <16> to <24>, wherein the magnetic particles are subjected to surface treatment with a silane coupling agent.

Aspect <26> of the present invention provides the rubber magnet sheet according to any one of aspects <16> to <25>, wherein the magnetic particles are subjected to surface treatment with a surface oxidation inhibitor.

Aspect <27> of the present invention provides a method of producing the rubber magnet sheet according to any one of aspects <16> to <26>, wherein the rubber magnet sheet is formed by accomplishing, in the named order, an unvulcanized sheet forming step in which a compound in which the magnetic particles are dispersed into the matrix is formed into a sheet shape; a temperature raising step in which the unvulcanized sheet is heated to a temperature at which the compound softens; a magnetic field applying step in which a magnetic field is applied to the unvulcanized sheet in the thickness direction; a compressing step in which a compressive force is applied in at least one direction intersecting at right angles to the thickness direction while the unvulcanized sheet is kept at a high temperature and the magnetic field is still applied; a cooling step in which the unvulcanized sheet is cooled while the compressive force is still applied; a pressure relieving step in which the compressive force applied to the cooled unvulcanized sheet is relieved; a demagnetizing step in which the unvulcanized sheet is demagnetized; a vulcanizing step in which the unvulcanized sheet is vulcanized; and a magnetizing step in which the vulcanized sheet is magnetized.

Aspect <28> of the present invention provides the method of producing the rubber magnet sheet according to aspect <27>, wherein the steps from the temperature raising step to the pressure relieving step are performed by arranging the unvulcanized sheet in a die, and when the compressing step is performed, the unvulcanized sheet is compressed by a die movable portion provided so as to be displaceable in the compression direction.

Aspect <29> of the present invention provides the method of producing the rubber magnet sheet according to aspect <27> or <28>, wherein the magnetic field applied in the thickness direction of the unvulcanized sheet is removed in the cooling step or the pressure relieving step.

The effects of the present invention in terms of aspects <1> to <16> will be explained below.

According to the aspect <1>, since the magnetic field from the rubber magnet is detected by the magnetism sensor and the elongation of conveyor belt is measured from the variations in magnetic field, an influence of weather and surrounding environment is little as compared with the electrical and optical methods. Also, since the flexible rubber magnet is embedded, the rubber magnet can be deformed by following the deformation of conveyor belt, for example, bending deformation caused by the pulley. The lives of both of the conveyor belt and the rubber magnet are not shortened because the rubber magnet is embedded.

According to the aspect <2>, since an interval between the magnets arranged in the lengthwise direction of the driven conveyor belt is measured, the elongation of belt can be measured exactly by comparing the interval with an interval in a state in which an external force is not applied.

According to the aspect <3>, since the plurality of rubber magnets are arranged so that the orientation of magnetic poles is as described above, the sinusoidal magnetic field in which peaks adjoin each other can be formed in the belt length direction, so that the above-described measuring method can be realized.

According to the aspect <4>, since the width direction guide for regulating the position of conveyor belt in the widthwise direction is provided on both sides in the belt width direction of the magnetism sensor, a measurement error caused by a zigzag movement or positional shift in the widthwise direction of conveyor belt can be eliminated, so that measurement can be made with high accuracy.

According to the aspect <5>, since the rubber magnet is provided in the vicinity of the joint portion of reinforcing material where belt breakage is most liable to occur, the belt breakage can be predicted with a high probability.

According to the aspect <6>, since the belt speed measuring means measures the rotational speed of the pulley around which the conveyor belt is set, the speed of belt can be measured in real time with great ease and moreover with high accuracy.

According to the aspect <7>, since the wear extent of conveyor belt is determined from the magnitude of magnetic field detected by the magnetism sensor, the wear of conveyor belt can be measured with great ease and moreover without being affected by the surrounding environment. Also, since the magnet provided in the conveyor belt is a rubber magnet, the rubber magnet can be deformed by following a great deformation of conveyor belt. Therefore, troubles such that the rubber magnet is separated from the conveyor belt, the normal deformation of conveyor belt is hindered, or the rubber magnet is fractured can be prevented.

According to the aspect <8>, since the rubber magnet is arranged so that the magnetic poles are directed in the belt thickness direction, and one magnetic pole is exposed on the conveyor belt surface, if the conveyor belt surface for which the wear extent is measured is worn, the volume of rubber magnet exposed on this surface decreases. As a result, the magnetic force decreases gradually as the wear of conveyor belt surface progresses, so that the wear extent can be determined by detecting the magnetic field from the magnet by using the magnetism sensor.

According to the aspect <9>, since the width direction guide for regulating the position in the widthwise direction of a conveyor belt portion passing through a position close to the magnetism sensor is provided, a measurement error caused by a zigzag movement or positional shift in the widthwise direction of conveyor belt can be eliminated, so that measurement can be made with high accuracy.

According to the aspect <10>, since the temperature of a conveyor belt portion in which the temperature-sensitive rubber compound magnet is embedded is determined from the magnitude of the magnetic field detected by the magnetism sensor, even if objects to be conveyed, which have high temperatures, are mounted on the conveyor belt, the internal temperature of conveyor belt can be measured directly regardless of the temperatures of objects to be conveyed. Therefore, the signs of accident can be caught, or the life of conveyor belt can be monitored.

According to the aspect <11>, since the temperature-sensitive rubber compound magnet has a property that the magnetic force varies in accordance with temperature variations in the predetermined temperature range, the magnetic force of temperature-sensitive rubber compound magnet can be related to the temperature thereof unequivocally. Therefore, the temperature of temperature-sensitive rubber compound magnet, and hence the temperature of a conveyor belt portion in which the temperature-sensitive rubber compound magnet is embedded can be determined from the magnitude of the magnetic field detected by the magnetism sensor.

According to the aspect <12>, since the temperature-sensitive rubber compound magnet is formed by connecting the temperature-sensitive magnetic body, in which the permeability decreases as the temperature rises, to the permanent magnet in series, if the temperature of a desired portion of conveyor belt rises abnormally, the permeability of temperature-sensitive magnetic body decreases, and the magnetic field from the temperature-sensitive rubber compound magnet decreases, so that the temperature-sensitive rubber compound magnet can be provided with the above-described property easily. Also, the magnetic force can be varied with high sensitivity as compared with the case where the temperature-sensitive rubber compound magnet is formed by the permanent magnet only.

According to the aspect <13>, since the temperature-sensitive rubber compound magnet is formed by the permanent magnet and the temperature-sensitive magnetic body arranged around the permanent magnet, in the case where the temperature of a desired portion of conveyor belt is normal, the lines of magnetic force coming from one magnetic pole of the permanent magnet pass through the highly permeable temperature-sensitive magnetic body and enter into the other magnetic pole, and hence the magnetic field formed on the outside of the temperature-sensitive rubber compound magnet is small. However, if the temperature of the desired portion of conveyor belt rises abnormally, the permeability of temperature-sensitive magnetic body decreases. As a result, the number of lines of magnetic force, which come from one magnetic pole of the permanent magnet, passing through the temperature-sensitive magnetic body, and enter into the other magnetic pole, decreases, and accordingly the magnetic field from the temperature-sensitive rubber compound magnet increases, so that the temperature-sensitive rubber compound magnet can be provided with the above-described property easily. Also, the magnetic force can be varied with high sensitivity as compared with the case where the temperature-sensitive rubber compound magnet is formed by the permanent magnet only.

According to the aspect <12> and <13>, since the permanent magnet and the temperature-sensitive magnetic body, which constitute the temperature-sensitive rubber compound magnet, are formed by the bond magnetic body formed by mixedly dispersing magnetic particles into a rubber, the temperature-sensitive rubber compound magnet can be deformed by following a great deformation of conveyor belt. Therefore, troubles such that the rubber magnet is separated from the conveyor belt, the normal deformation of conveyor belt is hindered, or the rubber magnet is fractured can be prevented.

According to the aspect <14>, since the width direction guide for regulating the position in the widthwise direction of a conveyor belt portion passing through a position closest to the magnetism sensor is provided, a measurement error caused by a zigzag movement or positional shift in the widthwise direction of conveyor belt can be eliminated, so that measurement can be made with high- accuracy.

According to the aspect <15>, since the magnetism sensor is provided in the vicinity of the downstream side in the conveyor belt running direction of a charging portion in which objects to be conveyed are charged, an influence of the objects to be conveyed, which have high temperatures, on the temperature of conveyor belt can be known, which contributes to the control and regulation of objects to be conveyed.

According to the aspect <16>, there can be provided the rubber magnet sheet which is not broken or fractured even if being subjected to continual bending stresses or tensile stresses, and provides a stable magnetic force for a long period of time, and moreover the rubber magnet sheet carries a high magnetic force. Therefore, a strong magnetic force necessary for monitoring the variations in magnetic field can be formed by a light-weight magnet.

BEST MODE FOR CARRYING OUT THE INVENTION

Figure 1:
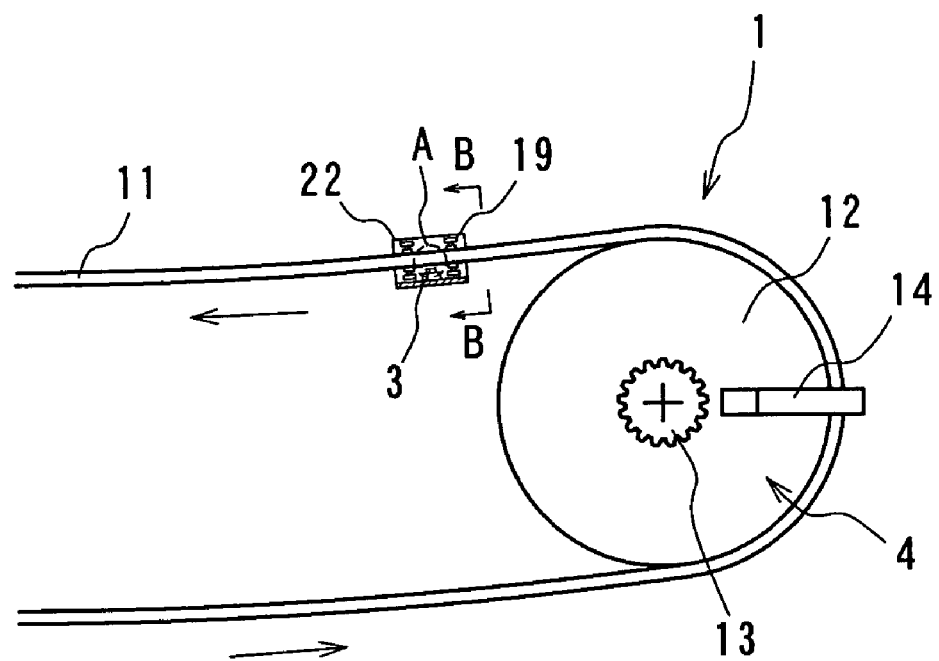
FIG. 1 is a side view showing a conveyor belt elongation measuring device of a first embodiment in accordance with the present invention.
Figure 2:
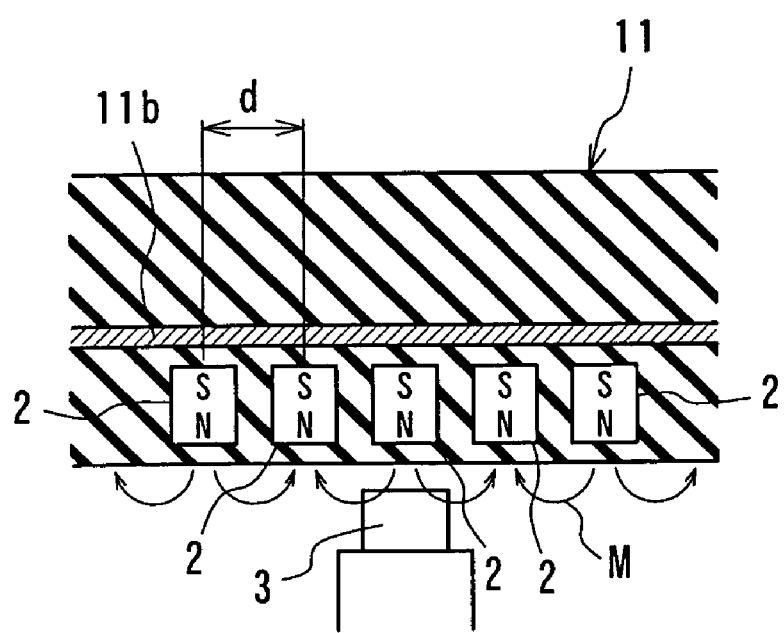
FIG. 2 is an enlarged sectional view of portion A in FIG. 1.
Figure 3:
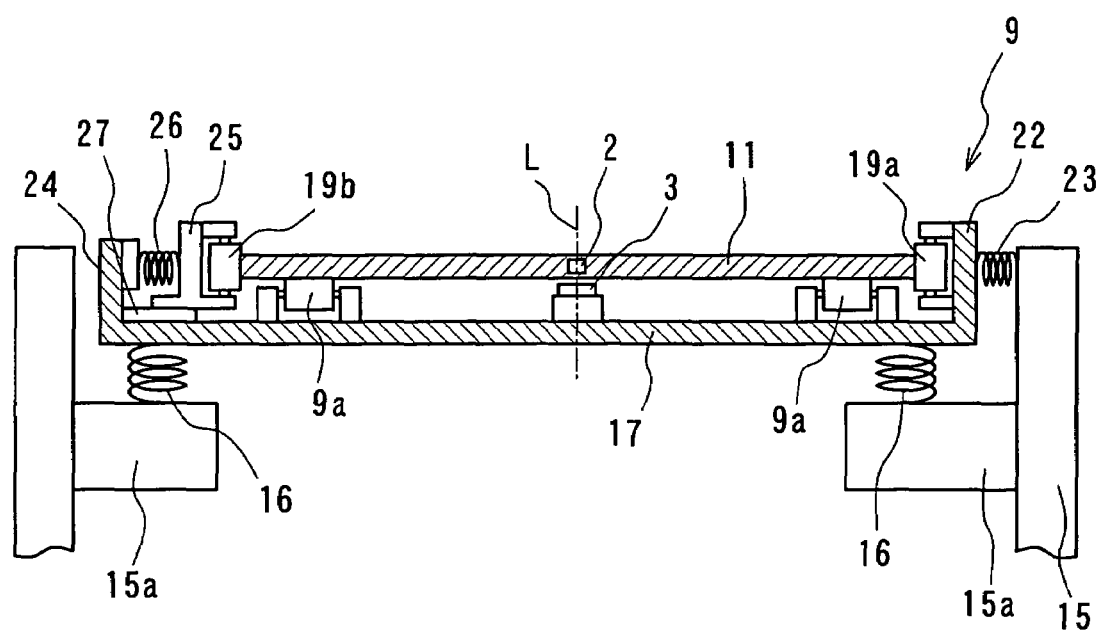
FIG. 3 is a partial sectional view taken in the direction of the arrows along the line B-B of FIG. 1.

Embodiments of the present invention will be described with reference to the accompanying drawings. FIG. 1 is a side view showing a conveyor belt elongation measuring device of a first embodiment in accordance with the present invention, FIG. 2 is an enlarged sectional view of portion A in FIG. 1, and FIG. 3 is a partial sectional view taken in the direction of the arrows along the line B-B of FIG. 1. A conveyor belt elongation measuring device 1 includes a plurality of rubber magnets 2 embedded so as to be arranged in the lengthwise direction of a conveyor belt 11, a magnetism sensor 3 fixed to the earth to detect a magnetic field from the rubber magnet 2, and a belt speed measuring means 4 for measuring the surface speed of the conveyor belt 11. The rubber magnets 2 are arranged so that the direction of magnetic poles thereof intersects at right angles to the surface of the conveyor belt 11 and also the directions of magnetic poles of the adjacent rubber magnets 2 are reverse.

Specifically, the rubber magnets 2 are arranged at equal intervals d on a vertical plane L extending in the lengthwise direction of the conveyor belt 11. As a result, these rubber magnets form a magnetic field having lines of magnetic force expressed by M in FIG. 2. Each of the rubber magnets 2 may be embedded in a rubber portion on either of top and back sides divided by a steel cord layer 11b that serves as a reinforcing material for the conveyor belt 11.

The magnetism sensor 3 is installed to a base plate 17 elastically supported, via springs 16, on support blocks 15a of pillars 15 fixed to the earth. The base plate 17 is provided so as to be displaceable in the widthwise direction and in the thickness direction by means of the extension and contraction of the spring 16 although the displacement thereof in the lengthwise direction of the conveyor belt 11 is restrained by a restraining means, not shown. The magnetism sensor 3 is preferably provided as close as possible to the passage position of the rubber magnets 2 to obtain high detection sensitivity, and is arranged on the vertical plane L close to the surface of the conveyor belt 11 on the side on which the rubber magnets 2 are embedded.

Also, the belt speed measuring means 4 is made up of a rotating plate 13 which rotates in synchronism with a pulley 12 around which the conveyor belt 11 is set and on which markings are made at predetermined intervals in the circumferential direction on the surface thereof, and a revolution sensor 14 which reads the markings on the rotating plate 13 and calculates the number of revolutions of the pulley 12 from the number of markings per unit time.

On both sides in the belt width direction of the magnetism sensor 3, a width direction guide 9 is provided to regulate the position of the conveyor belt 11 in the widthwise direction and thereby to keep the position of the rubber magnets 2, which are embedded in the conveyor belt 11, in the widthwise direction constant with respect to the magnetism sensor 3. The width direction guide 9 includes a guide roller 19a installed to one side plate 22 of the base plate 17 supporting the magnetism sensor 3, a spring 23 installed to the pillar 15, a linear guide 27, a guide roller 19b provided so as to be displaceable in the width direction on the base plate 17 while being guided by the linear guide 27, and a spring 26 supported on the other side plate 24, and functions so that the guide roller 19a is pressed against one end of the conveyor belt 11 in the widthwise direction by the action of the spring 23 to hold the relative position of the magnetism sensor 3 and the conveyor belt 11, and the guide roller 19b is pressed against the other end of the conveyor belt 11 in the widthwise direction by the action of the spring 26 to prevent the conveyor belt 11 from separating from the guide roller 19a.

Further, a thickness direction guide roller 9a is installed to the base plate 17. The guide roller 9a is pressed against the inside surface of the conveyor belt 11 in the thickness direction by the action of the spring 16, by which the separation distance between a conveyor belt portion of this portion and the magnetism sensor 3 can be kept constant.

In regulating the conveyor belt in both directions of the widthwise direction and the thickness direction, the guide rollers 19a, 19b, 9a are used instead of flat plates. The reason for this is the prevention of a phenomenon that if flat plates are used, the conveyor belt 11 is worn by the friction against the flat plates, and resultantly the position relative to the magnetism sensor 3 changes.

Figure 4:
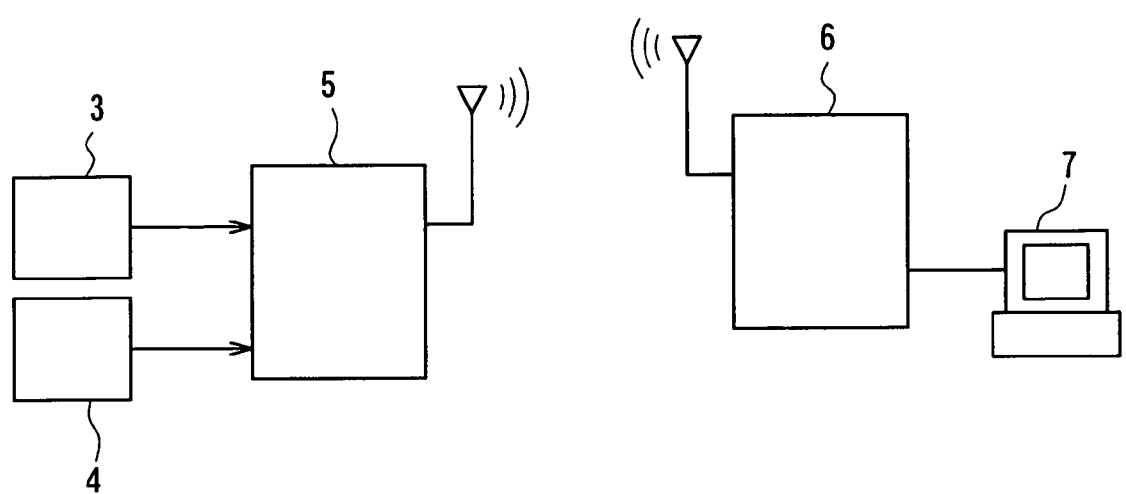
FIG. 4 is a block diagram showing a control section for the conveyor belt elongation measuring device.

FIG. 4 is a block diagram showing a control section for the conveyor belt elongation measuring device 1. The conveyor belt elongation measuring device 1 includes a site control unit 5 which receives measurement values from the magnetism sensor 3 and the belt speed measuring means 4, calculates belt elongation from the received values, and sends the calculation results on electric waves, and a central control unit 6 which receives the calculation results from the site control unit 5, and displays the calculation results on an output terminal 7 or gives an alarm when the elongation exceeds a predetermined threshold value.

In the above explanation, a calculating means for determining the elongation of the conveyor belt 11 is arranged in the site control unit 5. However, the calculating means can be provided in the central control unit 6. In this case, the site control unit 5 functions as a transmitter merely for transmitting data from the magnetism sensor 3 and the belt speed measuring means 4 to the central control unit 6.

Figure 5:
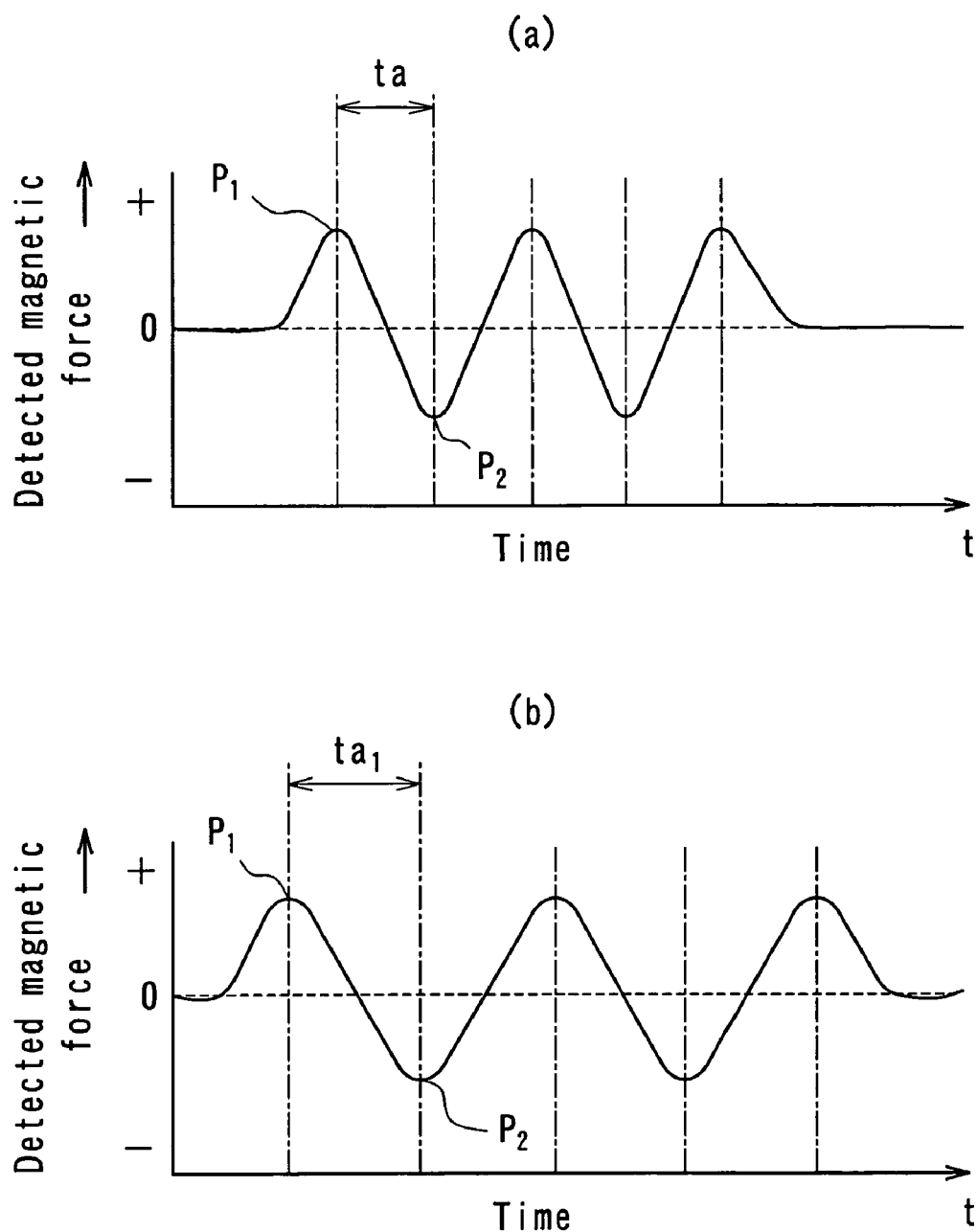
FIGS. 5(a) and 5(b) are graphs showing temporal variations in a magnetic force detected by a magnetism sensor.

A method of determining the elongation of conveyor belt by using the conveyor belt elongation measuring device 1 constructed as described above is explained. FIG. 5(a) is a graph showing temporal variations in a magnetic force detected by the magnetism sensor 3. By the displacement of the conveyor belt radiating a sinusoidal magnetic field in the lengthwise direction, the magnetism sensor 3 fixed to the earth can detect the temporal variations in a magnetic force in which plus-side peaks and minus-side peaks appear alternately.

In order to determine the elongation of the conveyor belt 11, it is necessary to measure, in advance, a distance between peaks of the magnetic field, for example, adjacent peaks in the state in which the elongation of the conveyor belt 11 is zero. This distance is the disposition pitch d of the rubber magnets 2, and for the measurement thereof, the magnetism sensor 3 is moved with respect to the conveyor belt 11 to determine the travel distance from peak to peak.

When the conveyor belt 11 is run, the graph shown in FIG. 5(a) can be obtained. From this graph, a time interval ta between two peaks, for example, adjacent peaks P1 and P2 is determined, and on the other hand, from the data measured by the belt speed measuring means 4, a surface speed v of the conveyor belt 11 at the time when the peak P1 appears is calculated. From these measurement values ta and v and the beforehand prepared value d, elongation $\epsilon$ can be determined from the before-described equation (1).

When the conveyor belt 11 deteriorates and the elongation thereof increases, even if the conveyor belt 11 runs at the same speed, the time interval between the peaks P1 and P2 increases to, for example, ta1 as shown in the graph of FIG. 5(b) expressed so as to correspond to FIG. 5(a). In this case as well, if ta is replaced with ta1 in Equation (1), the elongation of the conveyor belt 11 at the time of deterioration can be determined.

Here, a plurality of, for example, five rubber magnets 2 in the case shown in the figure are arranged in the belt length direction at intervals of, for example, 100 m, by which the elongation of belt at these positions can be measured over the total length of belt. Also, the joint portion of the steel cord 11b serving as a reinforcing material for the conveyor belt 11, which extends in the widthwise direction, is a portion that supports the lengthwise strength by means of rubber bonding only, so that it is preferable to arrange the rubber magnet 2 in the vicinity of this portion as well.

Also, the rubber magnet 2 is formed by a matrix consisting of at least one kind of rubber component that is preferably selected from a group consisting of butyl rubber and silicone rubber, and magnetically anisotropic magnetic particles dispersed into this matrix, for example, magnetic particles consisting of a rare earth alloy.

By using the above-described specific rubber component as the matrix of the rubber magnet 2, even if continual bending stresses or tensile stresses are applied, the rubber magnet 2 is not broken or fractured, and also the magnetic force can be stabilized over a long period of time.

In the case where butyl rubber is used as the rubber component of the rubber magnet 2, it is preferable that the degree of unsaturation be 0.3% or lower, and the Mooney viscosity $ML_{1+4}$(100° C.) be 60 or lower. If the degree of unsaturation of butyl rubber is lower than 0.3%, the crosslink point cannot be secured sufficiently. Also, if the Mooney viscosity $ML_{1+4}$(100° C.) of butyl rubber exceeds 60, the flexibility is too low, and hence the workability at the time when butyl rubber is kneaded with the magnetic particles is poor. This butyl rubber may contain halogenated butyl rubber, and as the halogenated butyl rubber, brominated butyl rubber and chlorinated butyl rubber can be cited.

Also, in the case where silicone rubber is used as the rubber component of the rubber magnet 2, as the silicone rubber, heat curing silicone rubber that has a low viscosity at the time of kneading in the ordinary temperature or increased temperature state and has a high strength after curing, cold-setting two-component RTV, or the like is preferably used. Herein, the cold-setting RTV is a silicone rubber available from Shin-Etsu Chemical Co., Ltd.

As the magnetic particles used for the rubber magnet 2, the same magnetic particles as those used for the conventional hard composite sheet can be used. Specifically, magnetically anisotropic magnetic particles such as rare earth magnetic particles should be used. Herein, as the rare earth magnetic particles, NdFeB, SmFeN, and the like can be cited.

Also, in the above-described example, as the belt speed measuring means 4, a means that measures the rotational speed of the pulley 12 and converts the measurement value into the surface speed of belt is used. However, besides this means, a means for directly measuring the surface speed of belt can be used. For example, the surface speed of belt can be determined by measuring the rotational speed of a roller having a predetermined diameter, which abuts on the belt surface and is rotated by being driven by the belt.

Figure 6:
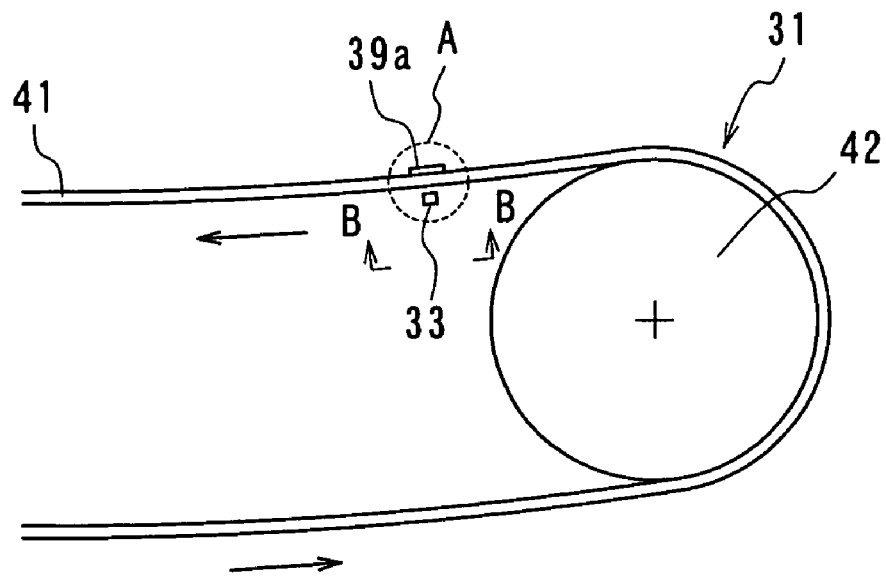
FIG. 6 is a side view showing a conveyor belt wear extent measuring device of a second embodiment in accordance with the present invention.
Figure 7:
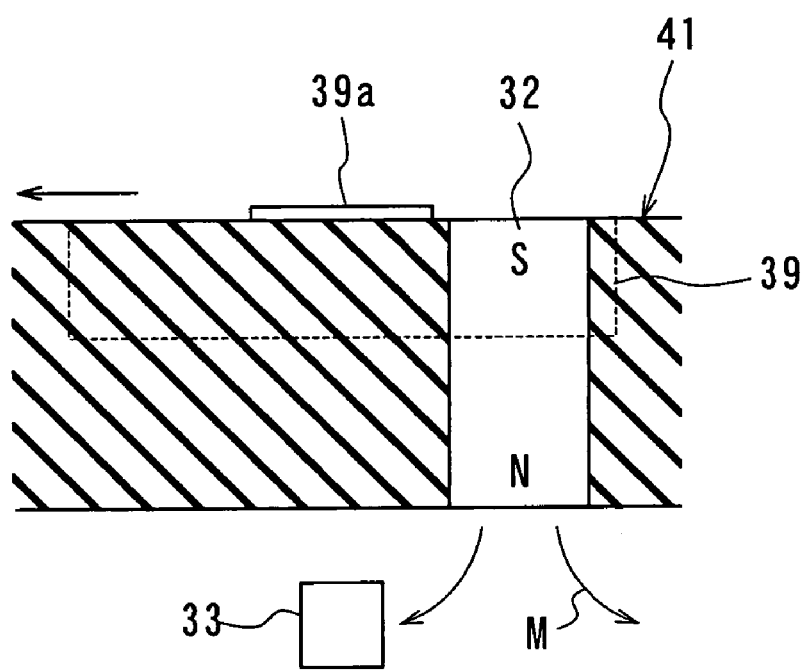
FIG. 7 is an enlarged sectional view of portion A in FIG. 6.
Figure 8:
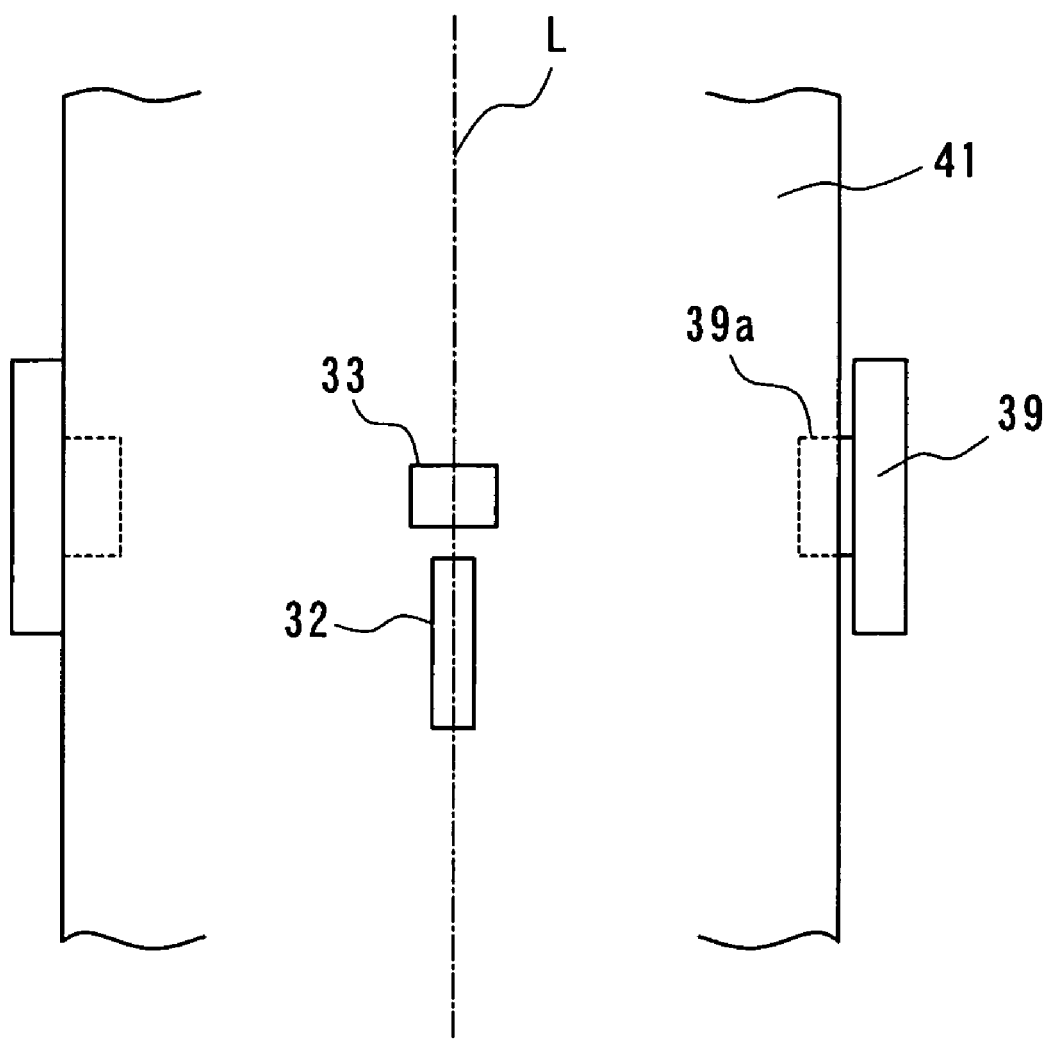
FIG. 8 is a front view taken in the direction of the arrows along the line B-B of FIG. 6.

FIG. 6 is a side view showing a conveyor belt temperature measuring device of a second embodiment in accordance with the present invention, FIG. 7 is an enlarged sectional view of portion A in FIG. 6, and FIG. 8 is a front view taken in the direction of the arrows along the line B-B of FIG. 6. A conveyor belt wear extent measuring device 31 includes a rubber magnet 32 provided so that a part thereof is exposed on a predetermined surface of a conveyor belt 41 set around a pulley 42, and a magnetism sensor 33 fixed to the earth to detect a magnetic field from the rubber magnet 32. In the case of this embodiment, the rubber magnet 32 is exposed on the surfaces on both sides. However, in the case where the wear degree of one surface only is to be measured, the rubber magnet 32 has only to be exposed on that surface only.

For the conveyor belt wear extent measuring device 31 of this embodiment, both magnetic poles of the rubber magnet 32 are arranged so as to be oriented in the thickness direction of the conveyor belt 41, and forms lines of magnetic force expressed by M in FIG. 7. The rubber magnet 32 moves in a vertical plane L as the conveyor belt 41 runs.

The rubber magnet 32 is formed by forming a bond magnetic body, which is produced by dispersedly mixing magnetic particles consisting of a permanent magnet material in compounded rubber, into a sheet form. As a result, the temperature-sensitive rubber compound magnet 2 has high flexibility, and can be deformed by following even a great deformation of the conveyor belt 41.

As the magnetic particles consisting of a permanent magnet material, inexpensive ferrite can be used. However, by using a rare earth magnet such as neodymium iron boron, samarium cobalt, or samarium iron nitrogen, an alnico magnet, or the like, a strong magnetic field can be formed.

The magnetism sensor 33 is preferably provided as close as possible to the passage position of the rubber magnet 32 to obtain high detection sensitivity, and is arranged on the vertical plane L close to the surface of the conveyor belt 11 on the side on which the rubber magnet 32 is exposed.

In the vicinity of magnetism sensor 33, a widthwise direction guide 39 is provided to regulate the widthwise position of a conveyor belt portion passing through the magnetism sensor 33. The widthwise direction guide 39 abuts on the widthwise end of the conveyor belt 41 and regulates widthwise position thereof to prevent the widthwise end of the conveyor belt 41 from being displaced from a predetermined position to the widthwise outside.

Further, a thickness direction guide 39a is also provided to keep the separation distance between a conveyor belt portion of this portion and the magnetism sensor 33 constant.

Figure 9:
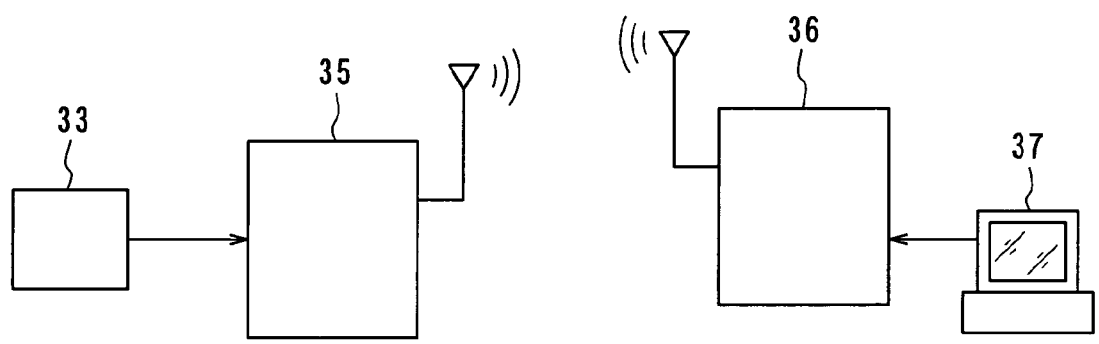
FIG. 9 is a block diagram showing a control section for the conveyor belt wear extent measuring device.

FIG. 9 is a block diagram showing a control section for the conveyor belt wear extent measuring device 31. The conveyor belt wear extent measuring device 31 includes a site control unit 35 which receives measurement values from the magnetism sensor 33, calculates belt wear extent from the received values, and sends the calculation results on electric waves, and a central control unit 36 which receives the calculation results from the site control unit 35, and displays the calculation results on an output terminal 37 or gives an alarm when the wear extent exceeds a predetermined threshold value.

In the above explanation, a calculating means for determining the wear extent of the conveyor belt 41 is arranged in the site control unit 35. However, the calculating means can be provided in the central control unit 36. In this case, the site control unit 35 functions as a transmitter merely for transmitting data from the magnetism sensor 33 to the central control unit 36.

Figure 10:
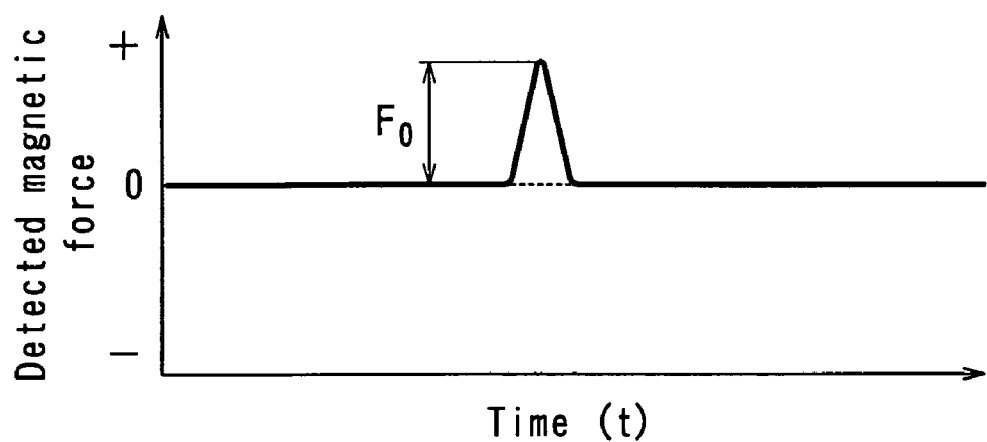
FIGS. 10(a) and 10(b) are graphs showing temporal variations in a magnetic force detected by a magnetism sensor.
Figure 10:
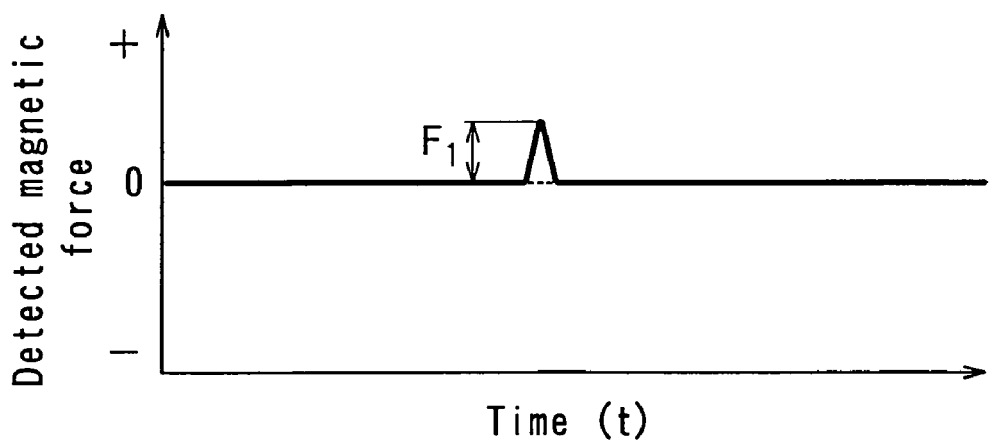

A method of determining the wear extent of conveyor belt by using the conveyor belt wear extent measuring device 31 constructed as described above is explained. FIG. 10(a) is a graph showing temporal variations in a magnetic force detected by the magnetism sensor 33. As the conveyor belt 41 in which the rubber magnet 32 is embedded runs, the magnetism sensor 33 detects temporal variations in a peak-form magnetic force when the rubber magnet 32 passes through a position close to the magnetism sensor 33 fixed to the earth.

The height $F_0$ of a detected peak varies according to the magnitude of a magnetic field from the rubber magnet 32. As described before, as the wear of the conveyor belt 41 progresses, the volume of the rubber magnet 32 decreases, and hence the magnetic field from the rubber magnet 32 weakens. Therefore, the magnitude of peak also decreases to F, as shown in FIG. 10(b). By preparing a relational expression between the magnitude of peak and the wear extent in advance, the wear extent of the conveyor belt surface on which the rubber magnet 32 is exposed can be determined from the magnitude $F_0$ of peak by the reverse calculation.

Here, the rubber magnets 32 are arranged in the belt length direction at predetermined intervals as necessary, for example, at intervals of 100 m, by which the wear extent at these positions can be measured over the total length of the conveyor belt 41.

Figure 11:
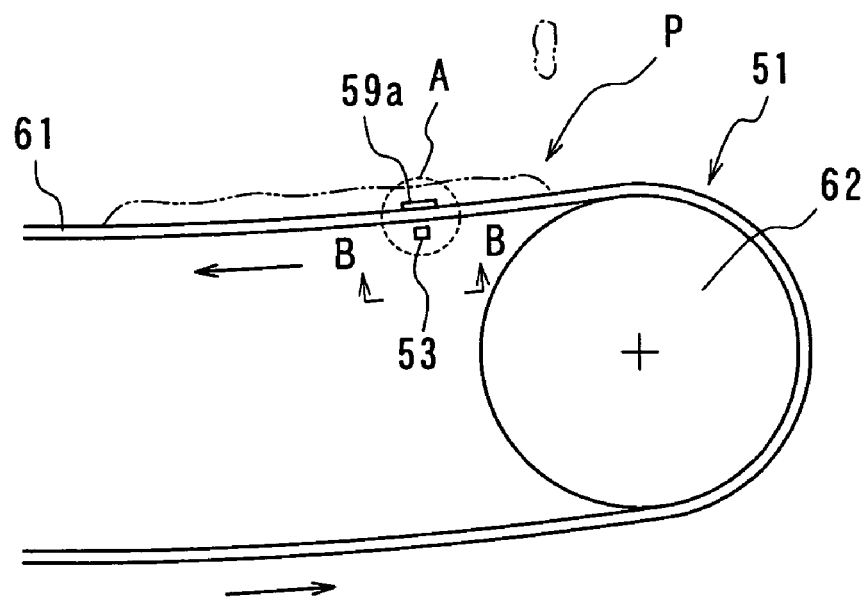
FIG. 11 is a side view showing a conveyor belt temperature measuring device of a third embodiment in accordance with the present invention.
Figure 12:
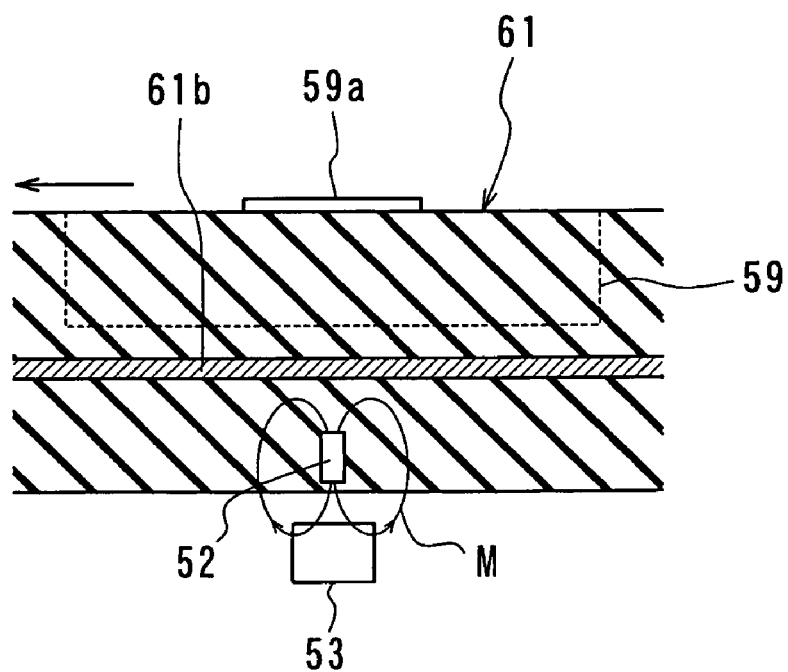
FIG. 12 is an enlarged sectional view of portion A in FIG. 11.
Figure 13:
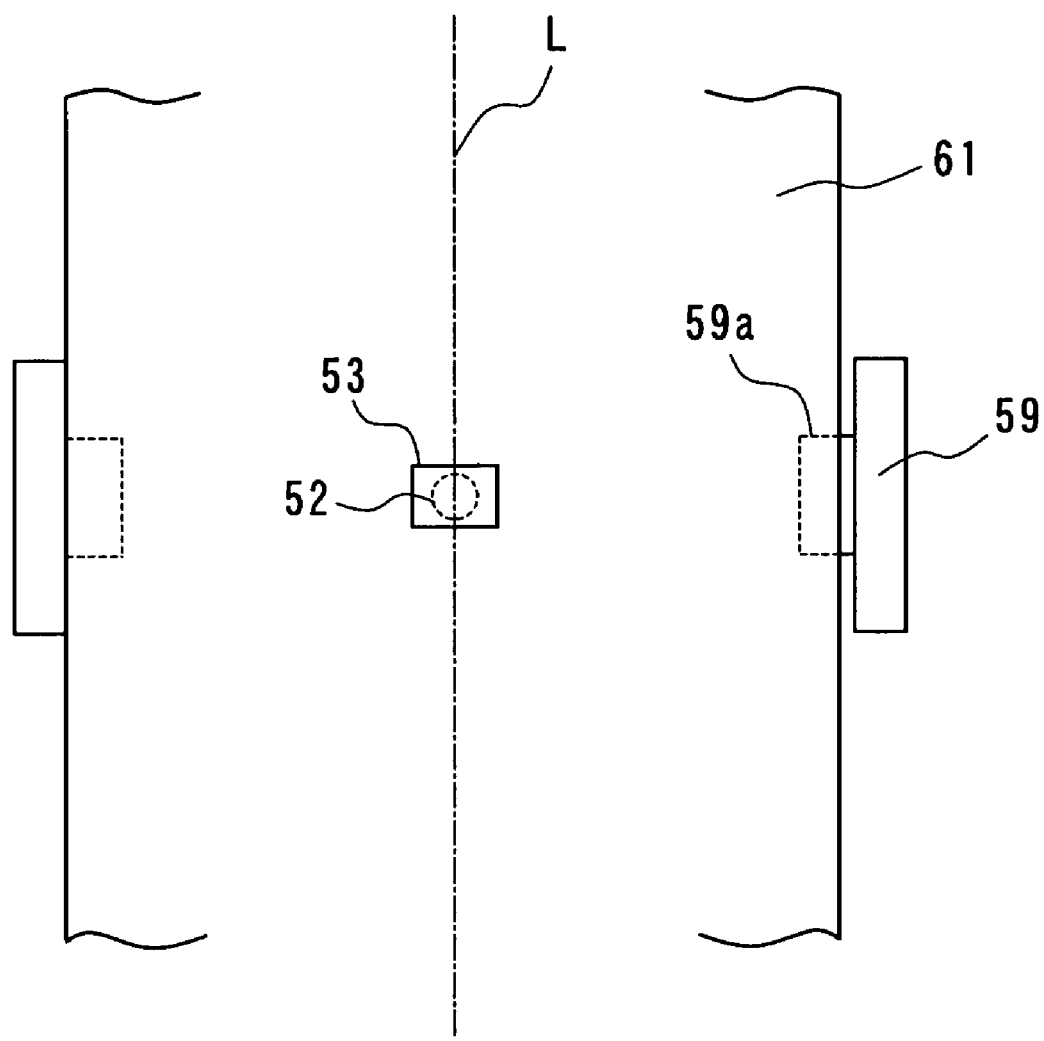
FIG. 13 is a front view taken in the direction of the arrows along the line B-B of FIG. 11.

FIG. 11 is a side view showing a conveyor belt temperature measuring device of a third embodiment in accordance with the present invention, FIG. 12 is an enlarged sectional view of portion A in FIG. 11, FIG. 13 is a front view taken in the direction of the arrows along the line B-B of FIG. 11, FIG. 14(a) is a front view showing a temperature-sensitive rubber compound magnet, and FIG. 14(b) is a plan view taken in the direction of the arrows along the line b-b of FIG. 14(a). A conveyor belt temperature measuring device 51 includes a temperature-sensitive rubber compound magnet 52 embedded in a predetermined portion of a conveyor belt 61 set around a pulley 62, and a magnetism sensor 53 fixed to the earth to detect a magnetic field from the temperature-sensitive rubber compound magnet 52.

Figure 14:
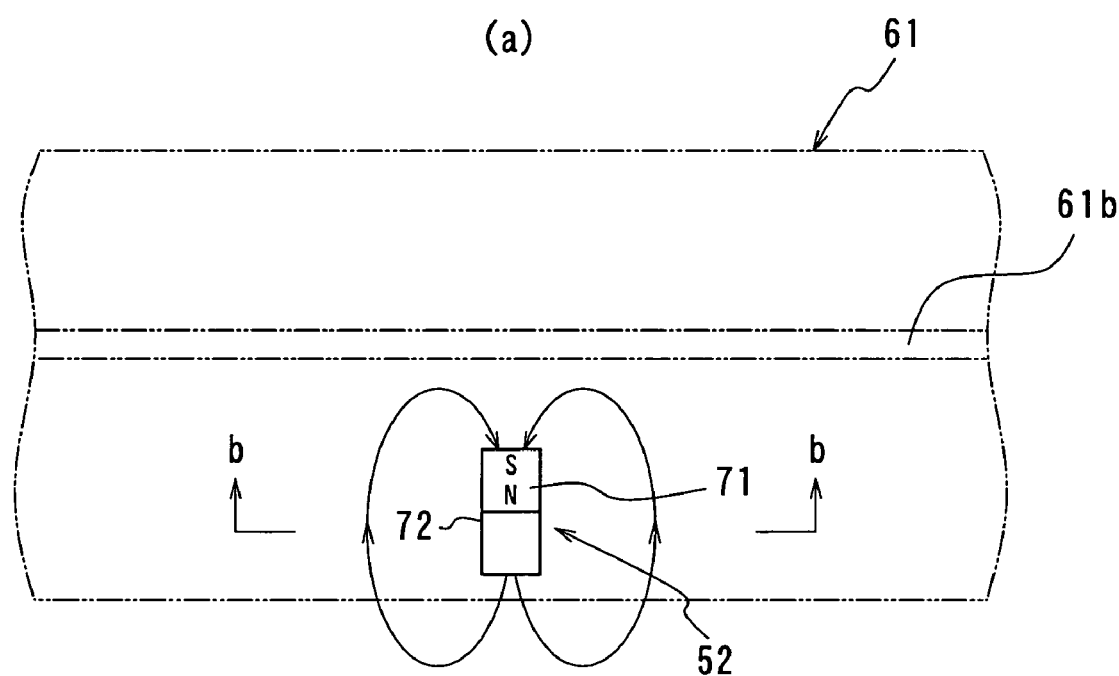
FIGS. 14(a) and 14(b) are front and plan views, respectively, showing a construction of a temperature-sensitive rubber compound magnet.
Figure 14:
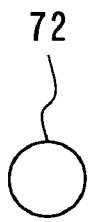

The temperature-sensitive rubber compound magnet 52 has a columnar shape, and is made up of a permanent magnet 71 and a temperature-sensitive magnetic body 72 connected to one magnetic pole, the N pole in the example shown in FIG. 14, of the permanent magnet 71 so as to extend the permanent magnet. The magnetic pole of the permanent magnet 71 on the side on which the temperature-sensitive magnetic body 72 is not connected and the end of the temperature-sensitive magnetic body 72, which is magnetized by the permanent magnet 71, on the side opposite to the permanent magnet 71 function as both magnetic poles of the temperature-sensitive rubber compound magnet 52.

In the conveyor belt temperature measuring device 51 of this embodiment, the line connecting both magnetic poles of the temperature-sensitive rubber compound magnet 52 is arranged in the thickness direction of the conveyor belt 61, and lines of magnetic force expressed by M in FIG. 12 are formed. The direction of the magnetic poles is not specially limited to the above-described direction. The temperature-sensitive rubber compound magnet 52 moves in a vertical plane L as the conveyor belt 61 runs.

The permanent magnet 71 and the temperature-sensitive magnetic body 72 each are formed by magnetic particles consisting of a magnet material, and a bond magnetic body produced by dispersedly mixing magnetic particles consisting of a highly permeable magnetic body, namely, a soft magnetic material in compounded rubber, and the temperature-sensitive rubber compound magnet 52 is formed by integrating the permanent magnet 71 and the temperature-sensitive magnetic body 72 into a cylindrical shape. As a result, the temperature-sensitive rubber compound magnet 52 has high flexibility, and can be deformed by following even a great deformation of the conveyor belt 61.

As the magnetic particles of the bond magnetic body constituting the permanent magnet 71, inexpensive ferrite can be used. However, by using a rare earth magnet such as neodymium iron boron, samarium cobalt, or samarium iron nitrogen, an alnico magnet, or the like, a strong magnetic field can be formed.

Also, the temperature-sensitive magnetic body 72 is formed of a soft magnetic material having the Curie point in the vicinity of a desired temperature, for example, the upper limit of the allowable temperature range of a desired portion of the conveyor belt 61, and the temperature-sensitive magnetic body 72 has a high permeability at temperatures far lower than the Curie point. However, at temperatures exceeding the Curie point, the temperature-sensitive magnetic body 72 has a property that the permeability becomes very low as the result of lost magnetization.

When the temperature of a conveyor belt portion in which the temperature-sensitive rubber compound magnet 52 is embedded is taken as Tx, if the temperature Tx is far lower than the Curie point, the permeability of the temperature-sensitive magnetic body 72 is high, so that the magnetic force of the temperature-sensitive rubber compound magnet 52 is kept great. However, if Tx exceeds the Curie point, the temperature-sensitive magnetic body 72 becomes a nonmagnetic body having a low permeability. As a result, the number of lines of magnetic force radiated from the magnetic pole of the whole of the temperature-sensitive rubber compound magnet 52 decreases, and hence the magnetic force decreases, so that the magnetic field detected by the magnetism sensor 53 decreases according to the temperature Tx of the conveyor belt portion.

The temperature-sensitive magnetic body 72 preferably has a property of decreasing the saturation magnetization in addition to the property of decreasing the permeability according to a temperature rise. Thereby, the sensitivity to variations in magnetic force of the temperature-sensitive rubber compound magnet 52 with temperature can further be improved.

As the magnetic particles of bond magnetic body constituting the temperature-sensitive magnetic body 72 having such a property, an alloy can be used by appropriately selecting from a Ni-based alloy containing NiCu, NiAl, NiCr, NiV, NiSi, NiTi, NiMo, NiSb and NiZn, a Mn—Cu based alloy, a Ni—Zn—$Fe_2O_4$ based alloy, a Mn—Zn—$Fe_2O_3$ based alloy, an Fe—Ni based alloy, a Ni—Cu based alloy, and an Fe—Ni—Cr—Si based alloy according to the region of temperature desired to be detected.

Also, the temperature-sensitive rubber compound magnet 52 can be embedded, as necessary, in a rubber portion on either of top and back sides divided by a steel cord layer 61b that serves as a reinforcing material for the conveyor belt 61.

The magnetism sensor 53 is preferably provided as close as possible to the passage position of the temperature-sensitive rubber compound magnet 52 to obtain a high detection sensitivity, and is arranged on the vertical plane L close to the surface of the conveyor belt 61 on the side on which the temperature-sensitive rubber compound magnet 52 is embedded.

Also, a widthwise direction guide 59 is provided to regulate the widthwise position of a conveyor belt portion passing through a portion closest to the magnetism sensor 53. The widthwise direction guide 59 abuts on the widthwise end of the conveyor belt 61 and regulates widthwise position thereof to prevent the widthwise end of the conveyor belt 61 from being displaced from a predetermined position to the widthwise outside.

Further, a thickness direction guide 59a is also provided to keep the separation distance between a conveyor belt portion of this portion and the magnetism sensor 53 constant.

Figure 15:
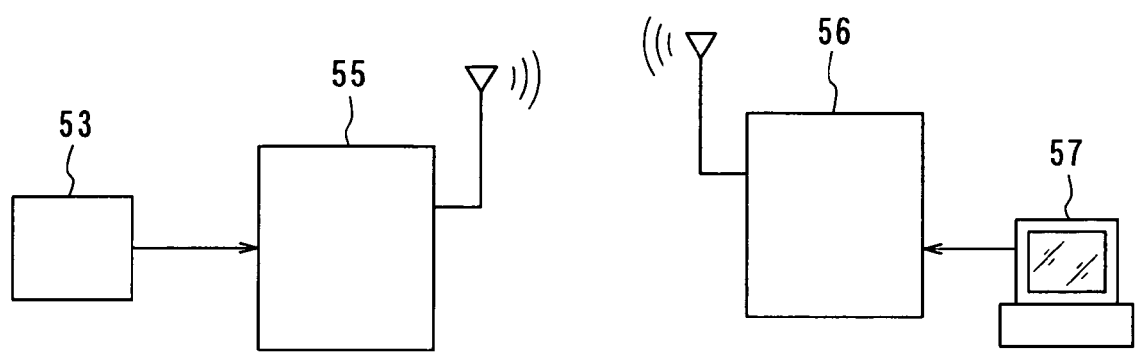
FIG. 15 is a block diagram showing a control section for the conveyor belt temperature measuring device.

FIG. 15 is a block diagram showing a control section for the conveyor belt temperature measuring device 51. The conveyor belt temperature measuring device 51 includes a site control unit 55 which receives measurement values from the-magnetism sensor 53, calculates belt temperature from the received values, and sends the calculation results on electric waves, and a central control unit 56 which receives the calculation results from the site control unit 55, and displays the calculation results on an output terminal 57 or gives an alarm when the temperature exceeds a predetermined threshold value.

In the above explanation, a calculating means for determining the temperature of the conveyor belt 61 is arranged in the site control unit 55. However, the calculating means can be provided in the central control unit 56. In this case, the site control unit 55 functions as a transmitter merely for transmitting data from the magnetism sensor 53 to the central control unit 56.

Figure 16:
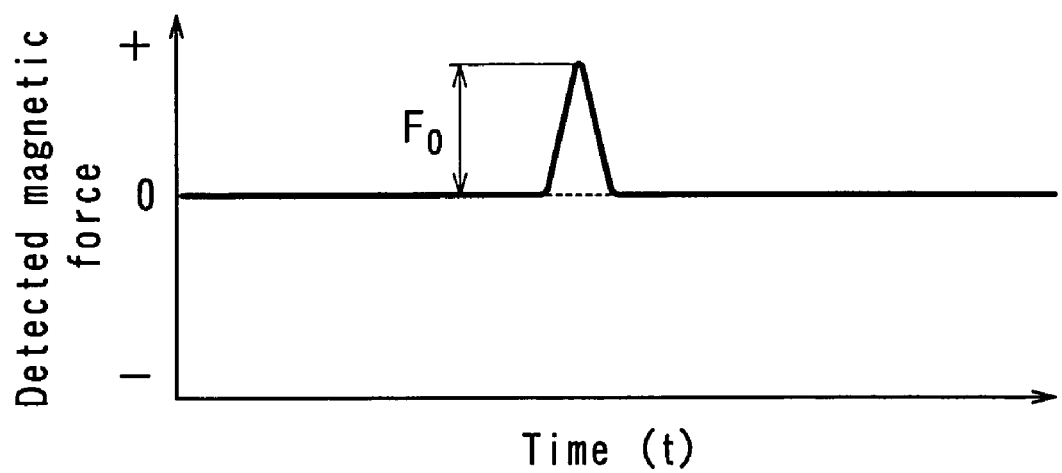
FIGS. 16(a) and 16(b) are graphs showing temporal variations in a magnetic force detected by a magnetism sensor.
Figure 16:
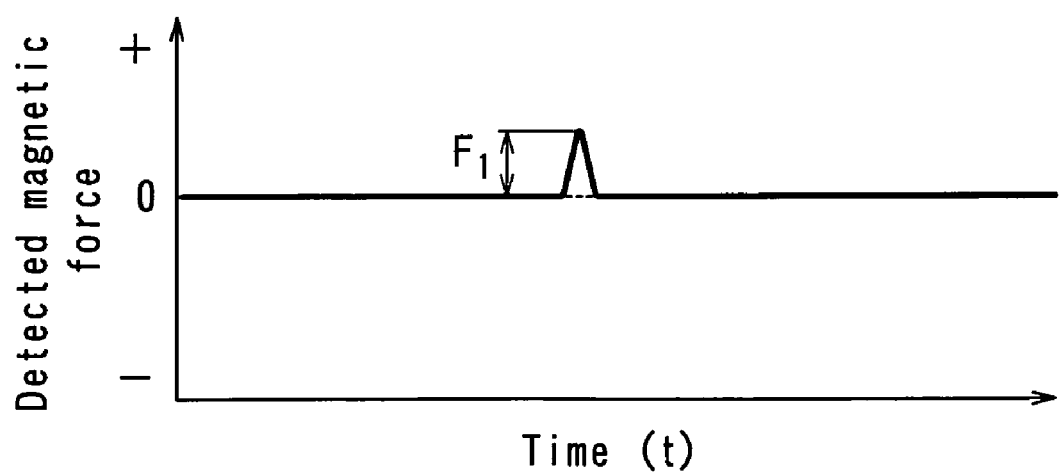

A method of determining the temperature of a desired portion of conveyor belt by using the conveyor belt temperature measuring device 51 constructed as described above is explained. FIG. 16(a) is a graph showing temporal variations in a magnetic force detected by the magnetism sensor 53. When the temperature Tx of the desired portion of conveyor belt is in the normal range, the temperature-sensitive rubber compound magnet 52 has a strong magnetic force as described above. Therefore, as the conveyor belt 61 runs, the magnetism sensor 53 detects temporal variations in a peak-form magnetic force when the temperature-sensitive rubber compound magnet 52 passes through a position close to the magnetism sensor 53 fixed to the earth.

The height $F_0$ of a detected peak varies according to the magnitude of a magnetic field from the temperature-sensitive rubber compound magnet 52. As described before, as the temperature Tx increases, the magnetic field weakens. Therefore, the magnitude of peak also decreases to $F_1$ as shown in FIG. 16(b). By preparing a relational expression between the magnitude of peak and the temperature in advance, the temperature Tx can be determined from the magnitude $F_0$ of peak by the reverse calculation.

Here, the temperature-sensitive rubber compound magnets 52 are arranged in the belt length direction at predetermined intervals as necessary, for example, at intervals of 100 m, by which the temperature at these positions can be measured over the total length of the conveyor belt 61. Also, in the case where objects to be conveyed have high temperatures, a downstream point in the vicinity of point P at which the objects to be conveyed are charged is of high importance for control because of exerting a great influence on the deterioration in the conveyor belt 61. Therefore, the magnetism sensor is preferably provided at a position at which the temperature of the downstream point is detected.

Figure 17:
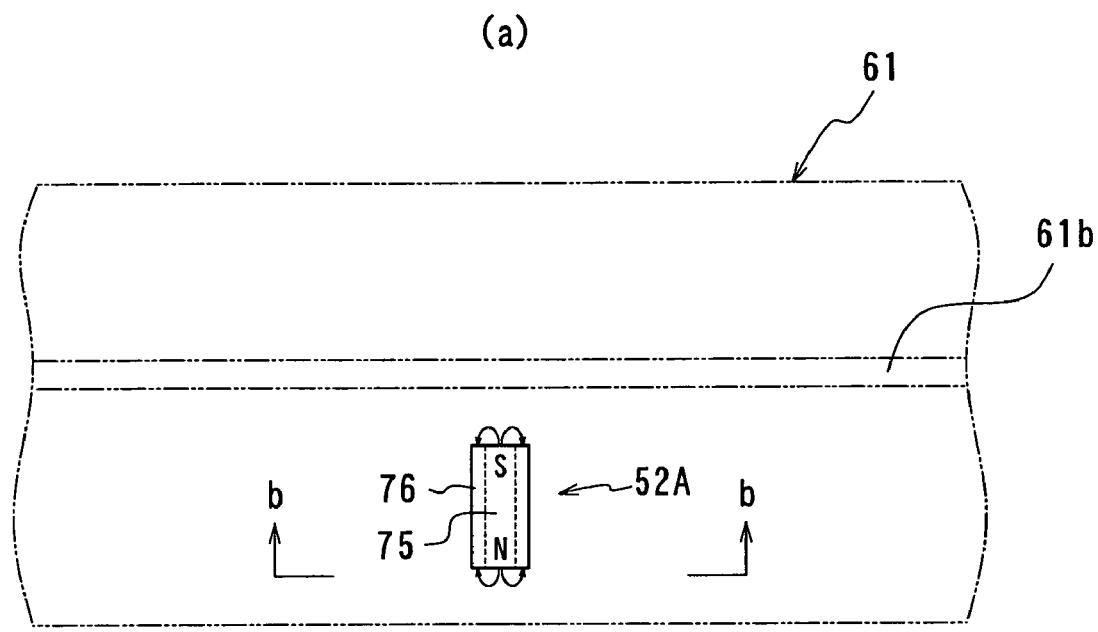
FIGS. 17(a) and 17(b) are front and plan views, respectively, showing a construction of a temperature-sensitive rubber compound magnet used for a conveyor belt temperature measuring device of a fourth embodiment in accordance with the present invention.
Figure 17:
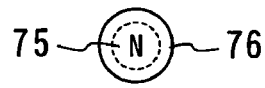

FIG. 17(a) is a front view relating to a conveyor belt temperature measuring device of a fourth embodiment in accordance with the present invention, showing a temperature-sensitive rubber compound magnet 52A embedded in the conveyor belt, and FIG. 17(b) is a plan view taken in the direction of the arrows along the line b-b of FIG. 17(a). In the conveyor belt temperature measuring device of the second embodiment, the temperature-sensitive rubber compound magnet 52 in the conveyor belt temperature measuring device 51 of the first embodiment shown in FIGS. 11 to 13 is replaced with the temperature-sensitive rubber compound magnet 52A shown in FIG. 14. The temperature-sensitive rubber compound magnet 52A has a columnar shape, and is made up of a columnar permanent magnet 75 and a temperature-sensitive magnetic body 76 arranged around the permanent-magnet 75. Both magnetic poles of the permanent magnet 75 function as both magnetic poles of the temperature-sensitive rubber compound magnet 52A as they are.

In the conveyor belt temperature measuring device 51 of this embodiment, the line connecting both magnetic poles of the temperature-sensitive rubber compound magnet 52A is arranged in the thickness direction of a conveyor belt 61. The direction of the magnetic poles is not specially limited to the above-described direction. The temperature-sensitive rubber compound magnet 52A moves in a vertical plane L as the conveyor belt 61 runs, shown in FIG. 13.

The material, property, and forming method of the permanent magnet 75 and the temperature-sensitive magnetic body 76 are the same as those shown in the first embodiment, so that the detailed explanation is omitted.

When the temperature of a conveyor belt portion in which the temperature-sensitive rubber compound magnet 52A is embedded is taken as Tx, if the temperature Tx is far lower than the Curie point, the permeability of the temperature-sensitive magnetic body 76 is high. Therefore, almost all of the lines of magnetic force coming from one magnetic pole of the permanent magnet 75 pass through the temperature-sensitive magnetic body 76 and enter into the other magnetic pole, and hence the magnetic field formed on the outside of the temperature-sensitive rubber compound magnet 52A is small. However, if Tx increases abnormally, the permeability of the temperature-sensitive magnetic body 76 decreases. As a result, the number of lines of magnetic force, which come from one magnetic pole of the permanent magnet 75, passing through the temperature-sensitive magnetic body 76, and enter into the other magnetic pole, decreases, and accordingly the magnetic field from the temperature-sensitive rubber compound magnet 52A, which is detected by a magnetism sensor 53, increases.

Figure 18:
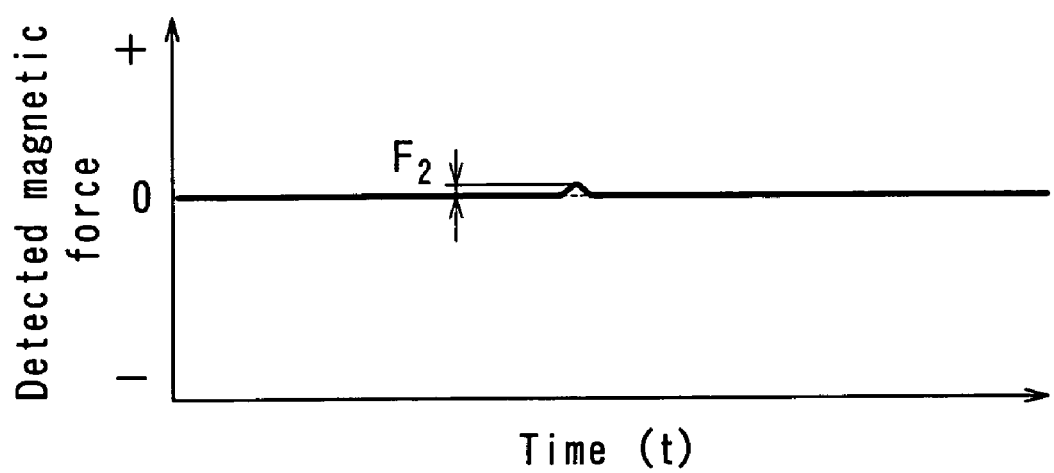
FIGS. 18(a) and 18(b) are graphs showing temporal variations in a magnetic force detected by a magnetism sensor.
Figure 18:
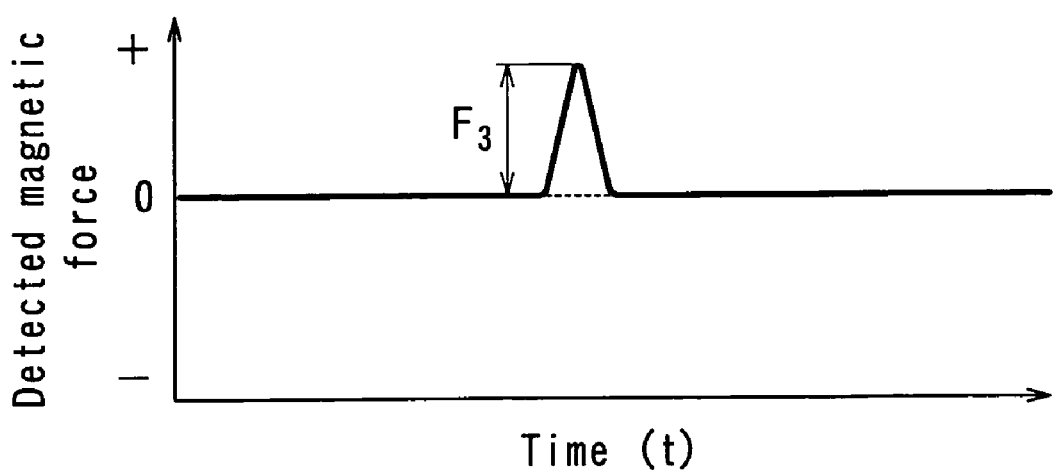

A method of determining the temperature of a desired portion of conveyor belt by using the conveyor belt temperature measuring device of the fourth embodiment constructed as described above is explained. FIG. 18(a) is a graph showing temporal variations in a magnetic force detected by the magnetism sensor 53. When the temperature Tx of the desired portion of conveyor belt is in the normal range, the magnetic field generated from the temperature-sensitive rubber compound magnet 52A is small as described above. Therefore, even if a conveyor belt portion in which the temperature-sensitive rubber compound magnet 52A is embedded crosses the magnetism sensor 53, the magnetic force detected by the magnetism sensor 53 is as small as $F_2$. However, if the temperature Tx increases abnormally, as shown in FIG. 18(b), the magnetic force detected by the magnetism sensor 53 increases to $F_3$. By preparing a relational expression between the magnitude of peak and the temperature in advance, the temperature Tx of the conveyor belt portion in which the temperature-sensitive rubber compound magnet 52A is embedded can be determined from the magnitude $F_3$ of peak by the reverse calculation.

In the case where a sheet-form rubber magnet is used as the rubber magnet used for detecting the elongation or wear of conveyor belt, this rubber magnet sheet must have a property corresponding to the above-described application. Hereunder is explained the property that the rubber magnetic sheet, which is used for detecting the elongation or wear of conveyor belt or used by being embedded in a tire consisting of a similar rubber member, must have, and the method of producing the rubber magnet sheet by taking the case where the rubber magnet sheet is embedded in the tire as an example.

At present, in order to enhance the tire function, a technique is being studied in which a magnet is affixed on the back side (inner surface) etc. of a tire tread portion, and variations in magnetic field is monitored to know a change in force acting on the tire, temperature, or the like, by which the safety at the time of operation is increased or the operation is sophisticated. When the tire is used, bending stresses and tensile stresses are applied continually. Therefore, in the case where the existing sintered magnet or sheet-form plastic magnet is affixed to the tire, there arises a problem in that the magnet is broken, is peeled off, or comes off gradually. For this reason, the magnet affixed to a tire must have flexibility.

Next, the rubber magnet used in the first or third embodiment and the method of producing the rubber magnet are explained.

Conventionally, as a rubber magnet having flexibility, there has been used a hard rubber magnet sheet in which styrene butadiene rubber (SBR), acrylic rubber, or the like is used as a matrix, and magnetic particles are dispersed into this matrix. For this hard rubber magnet, however, if the content of magnetic particles in the hard rubber magnet sheet is made 50 vol % or higher to obtain a magnetic force enough to monitor variations in magnetic field, the hard rubber magnet sheet becomes brittle though the surface hardness thereof is high. Therefore, if bending stresses or tensile stresses are applied continually, there arises a problem in that the rubber magnet sheet may be broken so that the original shape cannot be maintained. Also, this hard rubber magnet sheet has a problem in that when time has elapsed, or repeated stresses are applied, the magnetic particles in the matrix are moved by a repulsive force between magnetized magnetic particles, so that the magnetic force decreases.

Figure 21:
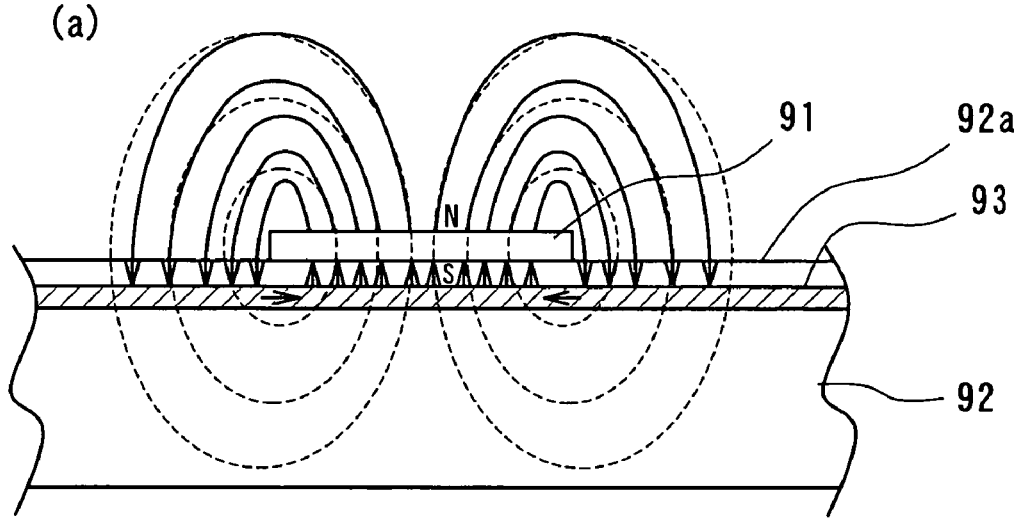
FIGS. 21(a) and 21(b) are schematic views showing distribution of lines of magnetic force radiated from a rubber magnet sheet affixed on the inside of a tread.
Figure 21:
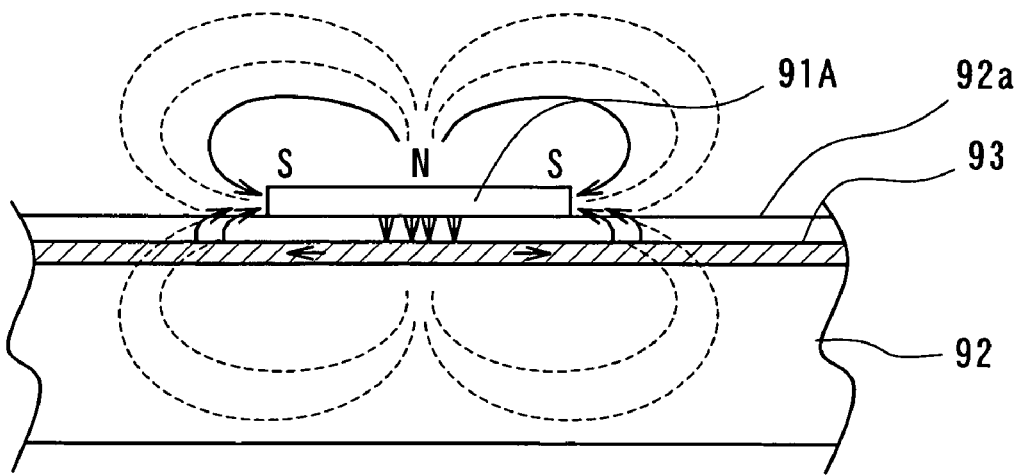

On the other hand, in order not to impair the inherent performance of tire, it is preferable that the rubber magnet affixed to the tire be as light as possible. However, the light weight of rubber magnet decreases the magnetic force, and hence a problem arises in that it is difficult to catch the variations in magnetic force from the magnet. To cope with this problem, a method has been studied in which the magnetic poles on the top and back surfaces of the rubber magnet sheet affixed to the inner surface of tire are made different, and a belt consisting of a steel cord disposed in the tread portion of tire is caused to function as a magnetic path, by which a strong magnetic field is formed. This method is explained with reference to FIG. 21.

FIG. 21(a) is a schematic view showing distribution of lines of magnetic force radiated from a rubber magnet sheet 91 affixed on an inner peripheral surface 92a of a tread portion 92 in which a steel belt 93 consisting of a steel cord is disposed. The shape of the lines of magnetic force radiated from the N and S poles formed on each of the top and back surfaces is symmetrical with respect to the magnet surface as shown by broken lines in the figure if the steel belt 93 is absent. Actually, however, since the steel belt 93 is disposed just near the inner peripheral surface 92a on which the magnet sheet 91 is affixed, the lines of magnetic force passing through the interior of the tread portion 92 pass through the steel cord having a high permeability. As a result, the lines of magnetic force exhibit the same distribution as that in the case where the S pole is formed in a peripheral region of the magnet 91 on the inner peripheral surface 92a of tire. The intensity of the magnetic field at a point just above the center of the plane of the N pole is equal to or higher than that in the case where the steel belt 93 is absent.

By contrast, the distribution state of lines of magnetic force of a rubber magnet sheet 91A in which magnetic poles having a different polarity are arranged in the same plane is shown in FIG. 21(b) in a form of comparison with FIG. 21(a). When the rubber magnet sheet 91A is affixed to the inner peripheral surface 92a of the tread portion 92 on which the steel belt 93 is absent, the rubber magnet sheet 91A forms distribution of lines of magnetic force which is symmetrical with respect to the sheet plane as shown by broken lines in FIG. 21(b). However, in the case where the tread portion 92 has the steel belt 93, almost all of the lines of magnetic force pass through the interior of the steel cord, so that the lines of magnetic force distributed on the outside of tire decrease.

Thus, the rubber magnet sheet affixed to the tire having the belt 93 consisting of a steel cord can generate a strong magnetic field in the tire by providing magnetic poles having a different polarity on the top and back surfaces. However, even in such a magnetic pole arrangement, the magnetic field decreases as the weight of magnet decreases. Therefore, to increase the magnetic force of this magnet per volume or per weight is the next big problem.

A rubber magnet sheet that will be explained below in detail as a fifth embodiment in accordance with the present invention solves the problems with the above-described conventional technique, and is configured so that it is not broken or fractured even if being subjected to continual bending stresses or tensile stresses, maintains a stable magnetic force for a long period of time, and has a light weight and a strong magnetic force. This rubber magnet sheet can be used as it is even in the case where it is embedded in a conveyor belt having the same matrix as that of tire.

The rubber magnet sheet of this embodiment is formed by a matrix consisting of at least one kind of rubber component that is selected from a group consisting of butyl rubber and silicone rubber, and magnetically anisotropic magnetic particles dispersed into this matrix, for example, magnetic particles consisting of a rare earth alloy.

The rubber magnet sheet of this embodiment uses the above-described specific rubber component that has not been used as a single substance in the past as the matrix of the rubber magnet sheet. Therefore, the rubber magnet sheet is not broken or fractured even if being subjected to continual bending stresses or tensile stresses, the magnetic force is stable for a long period of time, and when time has elapsed, or repeated stresses are applied, the magnetic particles in the matrix are not moved by a repulsive force between magnetized magnetic particles, so that the magnetic force does not decrease.

The rubber component used for this rubber magnet sheet is at least one kind of butyl rubber and silicone rubber. These rubber components can be returned to the original shape by relieving the stresses even if being subjected to continual bending stresses or tensile stresses.

In the case where butyl rubber is used as the rubber component of rubber magnet sheet, it is preferable that the degree of unsaturation be 0.3% or lower, and the Mooney viscosity $ML_{1+4}$(100° C.) be 60 or lower. If the degree of unsaturation of butyl rubber is lower than 0.3%, the crosslink point cannot be secured sufficiently. Also, if the Mooney viscosity $ML_{1+4}$(100° C.) of butyl rubber exceeds 60, the flexibility is too low, and hence the workability at the time when butyl rubber is kneaded with the magnetic particles is poor. This butyl rubber may contain halogenated butyl rubber, and as the halogenated butyl rubber, brominated butyl rubber and chlorinated butyl rubber can be cited.

Also, in the case where silicone rubber is used as the rubber component of rubber magnet sheet, as the silicone rubber, heat curing silicone rubber that has a low viscosity at the time of kneading in the ordinary temperature or increased temperature state and has a high strength after curing, cold-setting two-component RTV, or the like is preferably used. Herein, the cold-setting RTV is a silicone rubber available from Shin-Etsu Chemical Co., Ltd.

As the magnetic particles used for the rubber magnet sheet of this embodiment, the same magnetic particles as those used for the conventional hard composite sheet can be used. Specifically, magnetically anisotropic magnetic particles such as rare earth magnetic particles should be used. Herein, as the rare earth magnetic particles, NdFeB, SmFeN, and the like can be cited. The magnetic particles that exhibit magnetic anisotropy exhibit magnetic anisotropy according to the structure of crystal regardless of the shape, and can be a magnet having a high coercive force. All of these magnetic particles are a hard magnetic body.

In order to secure a sufficient flexibility while the content of magnetic particles enough to obtain a magnetic force necessary as a rubber magnet sheet is secured, it is necessary that the particle sizes of magnetic particles be not too large. For this purpose, the 50% diameters of the above-described magnetic particles measured with a laser diffraction particle size distribution meter are preferably 75 μm or smaller. If the 50% diameters of magnetic particles exceed 75 μm, when the content of magnetic particles is secured sufficiently, the magnetic particles do not enter into the matrix, so that the sheet strength decreases.

Also, the above-described magnetic particles are preferably subjected to surface treatment with a silane coupling agent. By the surface treatment of magnetic particles with a silane coupling agent, the magnetic particles are fixed in the matrix, so that variations in magnetic force can be restrained, and also the strength of the rubber magnet sheet itself can be improved. Herein, as the silane coupling agent, for example, KBE-846 manufactured by Shin-Etsu Chemical Co., Ltd., which is a sulfide-based silane coupling agent, can be cited.

Further, the above-described magnetic particles are preferably subjected to surface treatment with a surface oxidation inhibitor. On the surfaces of the magnetic particles, a thin oxide layer exists. By the surface treatment of magnetic particles with a surface oxidation inhibitor, irreversible deterioration of magnetic force caused by the progress of surface oxidation of the magnetic particles can be restrained. Herein, as the surface oxidation inhibitor, orthophosphoric acid can be cited.

For the rubber magnet sheet of this embodiment, the content of magnetic particles in the rubber magnet sheet is preferably 50 to 75 vol %. If the content of magnetic particles is lower than 50 vol %, the magnetic force is not enough to monitor variations in magnetic field. On the other hand, if the content of magnetic particles in the rubber magnet sheet exceeds 75 vol %, a matrix enough for fixing magnetic particles cannot be secured, and a portion in which the adjacent magnetic particles are not bonded to each other is produced, so that the strength of the sheet as a whole decreases.

For the rubber magnet sheet in accordance with the present invention, in a tensile test in conformance to DIN 3 standard, the breaking elongation at a rate of pulling of 100 mm/min is 10% or higher. Therefore, the rubber magnet sheet in accordance with the present invention is less liable to be broken even if tensile stresses are applied continually.

Also, in the case where a cylindrical body with a thickness of 0.5 mm or larger, a width of 2 mm, and an inside diameter of 20 mm, consisting of the rubber magnet sheet in accordance with the present invention, is radially crushed under a radial crushing condition that the cylindrical body is radially crushed at a stroke of 10 mm in the radial direction of the cylindrical body at a frequency of 2 times per second, the number of radial crushing cycles until this cylindrical body is fractured is 10,000 or larger. Therefore, the rubber magnet sheet in accordance with the present invention is less liable to be broken even if tensile stresses are applied continually.

Further, for this rubber magnet sheet, the hardness of the surface specified in JIS S6050 is 50 to 90 degrees. If the hardness of the sheet surface specified in JIS S6050 is lower than 50 degrees, it is difficult to maintain the shape when bending stresses or tensile stresses are applied continually. If the hardness exceeds 90 degrees, it is difficult to maintain the flexibility of sheet.

For the rubber magnet sheet in accordance with the present invention, in a flat sample sheet having top and back surfaces measuring 17 mm long by 17 mm wide by 1.3 mm thick, the magnetic flux density in the direction perpendicular to the top or back surface at a position 20 mm distant from the center of either of the top and back surfaces is 2 mT or higher. If the magnetic flux density is lower than 2 mT, the magnetic force is not enough to monitor variations in magnetic field. The magnetic flux density not lower than 2.2 mT is further preferable for the same reason. Also, for this rubber magnet sheet, the decrease in magnetic flux density in the case where the rubber magnet sheet is allowed to stand at ordinary temperature for 24 hours in an environment in which magnetism of a magnitude greater than the geomagnetism does not exist in the surroundings is 0.1% or less as compared with the case before the rubber magnet sheet is allowed to stand. If the decrease in magnetic flux density exceeds 0.1%, variations in magnetic force of the magnet itself are added to variations in magnetic force to be monitored inherently, so that the accuracy of information to be caught decreases remarkably. The same is true for the case where the magnetic flux density is decreased by the application of continual bending stresses.

Further, for this rubber magnet sheet, the decrease in magnetic flux density after 10,000 cycles of radial crushing under the above-described radial crushing condition is 0.1% or less as compared with the case before the radial crushing. If the decrease in magnetic flux density at the time of 10,000 cycles of radial crushing under this radial crushing condition exceeds 0.1%, in the case where the rubber magnet sheet is affixed to an article subjected to bending stresses continually, such as a tire, the deterioration in magnetic force caused by the use of article is too great, so that the rubber magnet sheet cannot be put to practical use.

With this rubber magnet sheet, a reinforcing agent such as carbon black, a softening agent such as aromatic oil, zinc oxide, stearic acid, an antiaging agent, a vulcanization accelerator, sulfur, and other compounding agents usually used in the rubber industry can be blended appropriately.

Next, a method of producing this rubber magnet sheet is explained. This producing method includes a kneading step in which the above-described rubber component and magnetic particles are kneaded into a compound containing magnetic particles, for example, by using a kneader or a blender; an unvulcanized sheet forming step in which this compound is extruded, for example, by using an extruder, or rolled by using a calender to form a continuous sheet having a predetermined cross section, and then the continuous sheet is cut to a predetermined length to form an unvulcanized sheet having a predetermined size; a temperature raising step in which the unvulcanized sheet is heated to a temperature at which the compound softens; a magnetic field applying step in which a magnetic field is applied to the unvulcanized sheet in the thickness direction; a compressing step in which a compressive force is applied in at least one direction intersecting at right angles to the thickness direction while the unvulcanized sheet is kept at a high temperature and the magnetic field is still applied; a cooling step in which the unvulcanized sheet is cooled while the compressive force is still applied; a pressure relieving step in which the compressive force applied to the cooled unvulcanized sheet is relieved; a demagnetizing step in which the unvulcanized sheet is demagnetized; a vulcanizing step in which the unvulcanized sheet is vulcanized; and a magnetizing step in which the vulcanized sheet is magnetized. By accomplishing these steps in the named order, the rubber magnet sheet can be formed.

Figure 19:
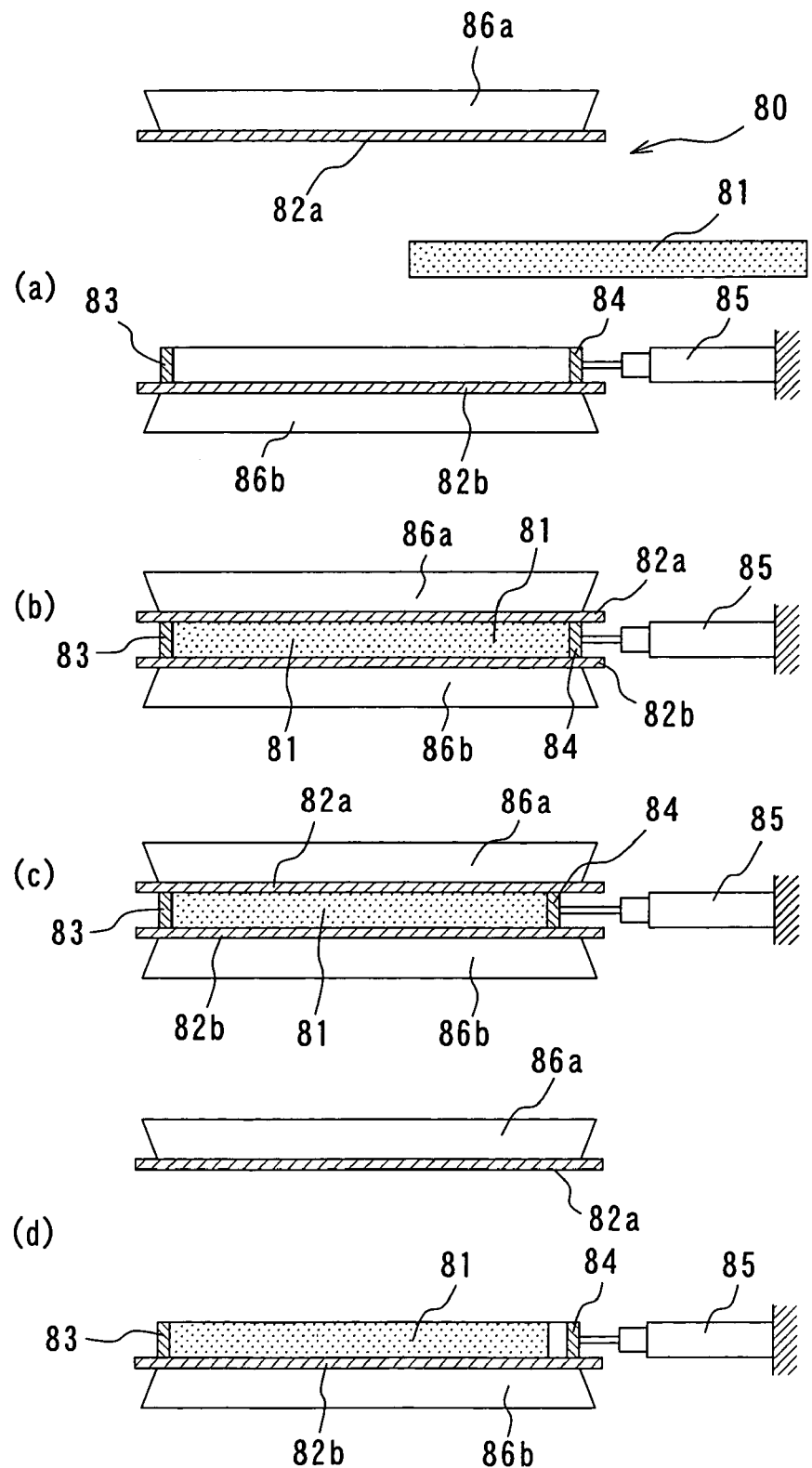
FIGS. 19(a) to 19(d) are schematic sectional views showing a magnetic field orientating die and an unvulcanized rubber sheet arranged in the die, the views being for illustrating a process from a temperature raising step to a pressure relieving step in a method of producing a rubber magnet sheet in accordance with the present invention.
Figure 20:
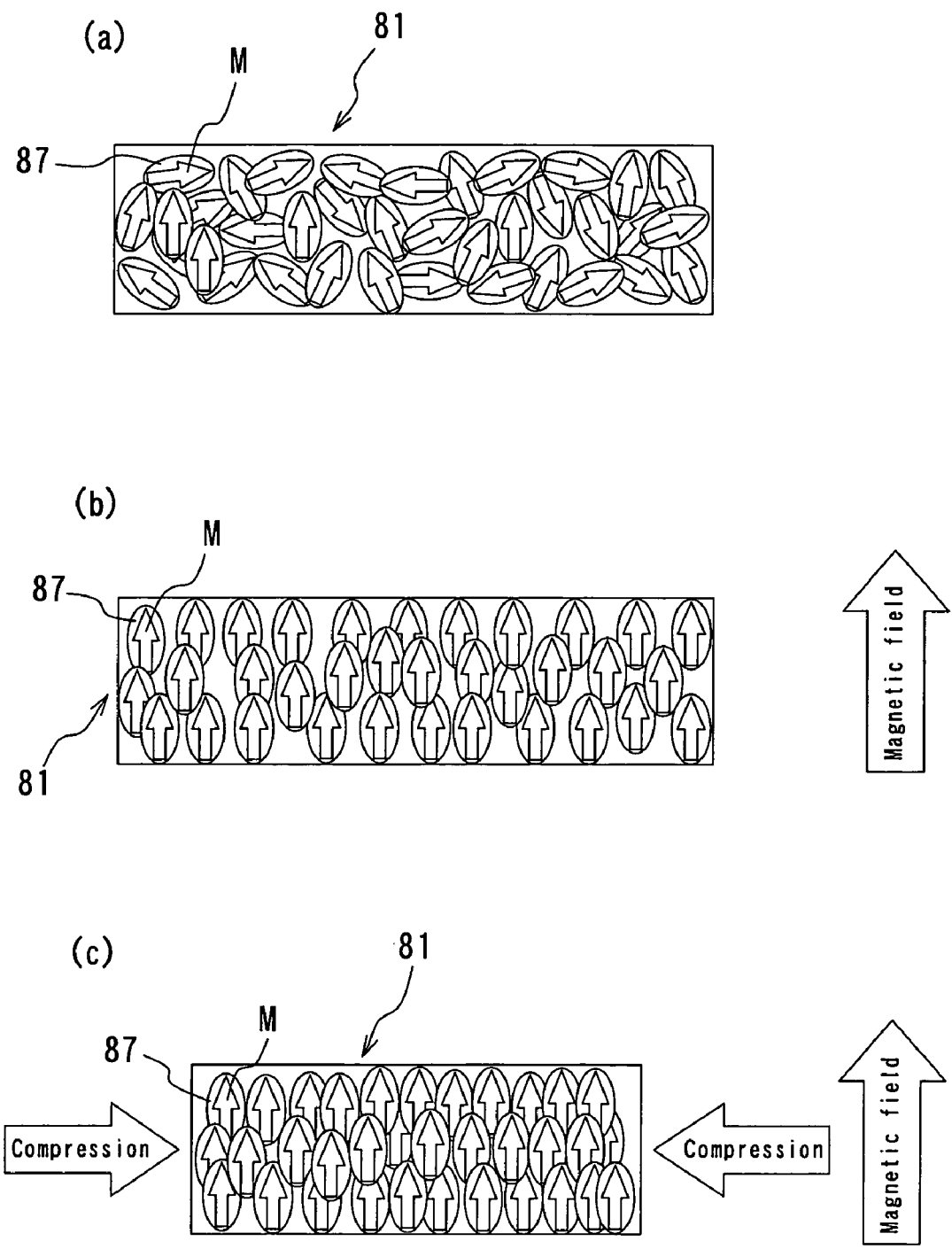
FIGS. 20(a) to 20(c) are schematic views schematically showing an orientation state of magnetic particles in the unvulcanized rubber sheet.

FIG. 19 is a schematic sectional view showing a magnetic field orientating die and an unvulcanized rubber sheet arranged in the die, the views being for illustrating the process from the temperature raising step to the pressure relieving step, and FIG. 20 is a schematic view schematically showing an orientation state of magnetic particles in the unvulcanized rubber sheet. FIG. 19(a) shows a state of a magnetic field orientating die 80 before an unvulcanized sheet 81 is arranged. The magnetic field orientating die 80 includes an upper die 82a and a lower die 82b each incorporating a heater for heating the unvulcanized sheet 81 from both of the top and back surfaces, a fixed side surface die 83, a movable side surface die 84, a cylinder 85 for displacing the movable side surface die 84 along the upper surface of the lower die 82b, and electromagnets 86a and 86b for applying a magnetic field in the thickness direction of the unvulcanized sheet 81. The upper die 82a and the upper electromagnet 86a can be displaced integrally in the vertical direction, and in the state shown in FIG. 19(a), they are positioned on the upper side.

FIG. 19(a) shows a state in which after the unvulcanized sheet 81 has been arranged in the die, the upper die 82a and the upper electromagnet 86a are lowered to close the magnetic field orientating die 80. In this closed state, first, the unvulcanized sheet 81 is heated to a temperature, at which this compound softens, for example, to about 120° C. in the case where the matrix consists of butyl rubber, by the heaters provided in the upper die 82a and the lower die 82b. Then, a current is allowed to flow in the electromagnets 86a and 86b to apply a magnetic field to the unvulcanized sheet 81 in the thickness direction, and this magnetic field applying state is held for a predetermined period of time, for example, for 120 minutes.

FIG. 20(a) shows a state of the unvulcanized sheet 81 before the magnetic field is applied. In this state, magnetic particles 87 are arranged in random directions, and hence the magnetic force of the unvulcanized sheet 81 as a whole is zero. However, when a magnetic field is applied at a temperature higher than the softening point of compound as shown in FIG. 20(b), the orientations of the magnetic particles 87 can be changed easily, so that the magnetic particles 87 rotates so that the orientation M of magnetic poles is aligned in the direction in which the magnetic field is applied. As a result, magnetic poles having a polarity opposite to each other are formed on both top and back surfaces of the unvulcanized sheet 81.

However, if the unvulcanized sheet 81 is cooled in this state and thereby the magnetic field is removed, the adjacent magnetic particles repulse each other, and the orientation of magnetic poles of magnetic particles becomes random again. In the producing method of this embodiment, however, the unvulcanized sheet 81 is compressed in the direction perpendicular to the direction of magnetic field before the magnetic field is removed. FIG. 19(c) shows the unvulcanized sheet 81 in this state and the magnetic field orientating die 80. The movable side surface die 84 is pushed toward the die center by using the cylinder 85 while the magnetic field is still applied at a high temperature higher than the softening point, by which the unvulcanized sheet 81 is compressed in the direction perpendicular to the thickness direction of the unvulcanized sheet 81. Then, the unvulcanized sheet 81 is cooled to ordinary temperature while this state is held. FIG. 20(c) shows the unvulcanized sheet 81 in this state. In this state, the magnetic particles are compressed in the direction perpendicular to the orientation of magnetic poles, so that the movement to the random state is restrained. Therefore, even if the magnetic field is removed, the orientation of the magnetic particles 87 in the unvulcanized sheet 81 is scarcely distorted, and the orientation state can be held by the cooling of the unvulcanized sheet 81.

When the unvulcanized sheet 81 is cooled under the action of compressive force, the cooling performed while the magnetic field is applied enables the orientation to be held more surely. However, the orientation can be held by compressive force only, and the application of magnetic field can be finished before cooling depending on the situation. Also, if the compressive force is applied before the magnetic field is applied, the orientation formed by magnetic field unfavorably becomes incomplete. On the other hand, the application of magnetic field may be started from a state of temperature lower than the softening point. Further, the timing of raising the temperature of the unvulcanized sheet 81 may be such that the unvulcanized sheet 81 is preheated before it is arranged in the die.

After the cooling of the unvulcanized sheet 81 under the action of compressive force has been finished, as shown in FIG. 19(d), the cylinder 85 is operated to move the movable side surface die 84 to the outside, and also the upper die 82a is raised to open the magnetic field orientating die 80, by which the unvulcanized sheet 81 is removed from the die 80.

Subsequently, the unvulcanized sheet 81 is vulcanized. In vulcanization, the temperature of the unvulcanized sheet 81 is raised. Therefore, at this time, the orientation of magnetic particles that has been established with effort is made random by the repulsive force between the magnetic particles. To prevent this phenomenon, the unvulcanized sheet 81 is demagnetized before vulcanization. This is the demagnetizing step. In demagnetization, the publicly-known method can be used in which the magnitude of magnetic field is decreased gradually while an a.c. magnetic field is applied, and is finally decreased to approximately zero.

Also, in the vulcanizing step, the unvulcanized sheet 81 can be vulcanized by using a vulcanizing die, but it may be vulcanized by open vulcanization in which the unvulcanized sheet 81 is merely heated. After the vulcanization has been finished, the vulcanized sheet is magnetized by applying a pulse magnetic field. Since the magnetic particles 87 of the unvulcanized sheet 81 have already been magnetically orientated, a high magnetic force can be obtained.

By being subjected to the series of steps from the temperature raising step to the magnetizing step, for the first time, the magnetic particles can be arranged in the same direction at a high ratio, and thereby a rubber magnet sheet of a very high magnetic force can be obtained.

EXAMPLES

Hereunder, the present invention is explained in more detail by taking examples. The present invention is not restricted by the examples described below.

Rubber magnet sheets having the composition given in Table 1 were prepared, and a tensile test, a radial crushing test, and magnetic flux density measurement were performed by the method described below. The Mooney viscosity $ML_{1+4}(100°\ C.)$ of the used rubber component was measured in conformance to JIS K6300 2:2001, and the surface hardness of rubber magnet sheet was measured in conformance to JIS S6050. The results are given in Table 1.

(1) Tensile Test

In the tensile test in conformance to DIN-3 standard, the breaking elongation at a rate of pulling of 100 mm/min was measured.

(2) Radial Crushing Test

A cylindrical body with a thickness of 1 mm, a width of 20 mm, and an inside diameter of 20 mm was prepared by using the rubber magnet sheet produced on a trial basis, and the cylindrical body was radially crushed at a stroke of 10 mm in the radial direction of the cylindrical body at a frequency of 2 times per second to measure the number of radial crushing cycles until this cylindrical body is fractured.

(3) Magnetic Flux Density Measurement

A rubber magnet sheet measuring 17 mm×17 mm×1.3 mm was produced on a trial basis, and was magnetized by the above-described producing method. The magnetic flux density in the direction perpendicular to a surface of 17 mm×17 mm of the magnetized sheet at a position 20 mm distant from the center of the surface was measured. Also, the magnetic flux density after the rubber magnet sheet had been allowed to stand at ordinary temperature for 24 hours in an environment in which magnetism of a magnitude greater than the geomagnetism did not exist in the surroundings was also measured. Further, a rubber magnet sheet measuring 17 mm×17 mm×1.3 mm was produced on a trial basis by using the rubber magnet sheet subjected to 10,000 cycles of radial crushing under the above-described radial crushing condition, and the magnetic flux density was measured in the same way as described above.

TABLE 1

| | | Comparative Example | Inventive Example 1 | Inventive Example 2 |
|---|---|---|---|---|
| Rubber component | Kind of rubber component | Acrylic rubber*1 | Butyl rubber*2 | Silicone rubber*3 |
| | Loadings (vol %) | 39.6 | 28.6 | 40 |
| | Degree of unsaturation (%) | — | 0.3 | — |
| | Mooney viscosity $ML_{1+4}(100°\ C.)$ | 35 | 45 | — |
| Magnetic particles | Kind of magnetic particles | NdFeB powder*4 | NdFeB powder*4 | NdFeB powder*4 |
| | Loadings (vol %) | 60 | 60 | 60 |
| | 50% diameter (µm) | 35 | 35 | 35 |
| Spindle oil (vol %) | | — | 10.6 | — |
| Zinc oxide (vol %) | | — | 0.2 | — |
| Stearic acid (vol %) | | — | 0.2 | — |
| Crosslinking agent (vol %)*5 | | 0.4 | — | — |
| Sulfur (vol %) | | — | 0.3 | — |
| Silane coupling agent (vol %) | | — | 0.1 | — |
| Thickness of rubber compound sheet (mm) | | 1.3 | 1.3 | 1.3 |
| Hardness of rubber compound sheet (degree) | | 95 | 80 | 70 |
| Breaking elongation (%) | | 3 | 32 | 25 |
| Number of radial crushing cycles until fracture (cycles) | | 1 | 10,000 cycles or more | 10,000 cycles or more |
| Initial magnetic flux density (mT) | | 2.12 | 2.73 | 2.60 |
| Magnetic flux density after 24 hr standing (mT) | | 2.11 | 2.72 | 2.60 |
| Magnetic flux density after 10,000 cycles of radial crushing (mT) | | — | 2.72 | 2.59 |

*1Nipol AR71L manufactured by Nippon Zeon Co., Ltd.
*2Butyl065 manufactured by JSR
*3M4601A, B (two-component) manufactured by Wacker Silicone
*4MFP-12 manufactured by Aichi Steel Works, Ltd.
*5NOCCELER BZ-P manufactured by Ouchi Shinko Chemical Co., Ltd.
*6KBE-846 manufactured by Shin-Etsu Chemical Co., Ltd.

For the rubber magnet sheets of Examples 1 and 2, the elongation until breakage is high and the number of radial crushing cycles is large as compared with the hard composite sheet of conventional example. Also, for the rubber magnet sheets of Examples 1 and 2, the decrease in magnetic flux density after 24 hr standing and the decrease in magnetic flux density after radial crushing are sufficiently small, and the magnetic force is significantly high.

The invention claimed is:

1. A method of measuring conveyor belt wear extent, wherein when the wear extent of the surface of a running conveyor belt is measured, a magnetic field from a rubber magnet which is provided in a desired portion of conveyor belt and a part of which is exposed on the conveyor belt surface is detected by a magnetism sensor fixed to the earth, and the wear extent of conveyor belt is determined from the magnitude of the detected magnetic field by utilizing a phenomenon that the magnetic field is varied by a decrease in volume of rubber magnet caused by the progress of wear of the desired portion of conveyor belt.

2. An apparatus for measuring conveyor belt wear extent, which is used in the method of measuring conveyor belt wear extent described in claim 1, wherein the apparatus comprises a rubber magnet provided in a desired portion of a conveyor belt and a magnetism sensor for detecting a magnetic field from the rubber magnet, the rubber magnet is arranged so that the magnetic poles are directed in the belt thickness direction, and one magnetic pole is exposed on the conveyor belt surface.

3. The apparatus for measuring conveyor belt wear extent according to claim 2, wherein a width direction guide for regulating the position in the widthwise direction of a conveyor belt portion passing through a position close to the magnetism sensor is provided.

* * * * *